United States Patent
Piesinger

(10) Patent No.: US 8,098,773 B1
(45) Date of Patent: Jan. 17, 2012

(54) COMMUNICATION METHOD AND APPARATUS

(76) Inventor: Gregory H. Piesinger, Cave Creek, AZ (US)

(*) Notice: Subject to any disclaimer, the term of this patent is extended or adjusted under 35 U.S.C. 154(b) by 1514 days.

(21) Appl. No.: 11/521,167

(22) Filed: Sep. 14, 2006

Related U.S. Application Data

(60) Provisional application No. 60/718,506, filed on Sep. 19, 2005.

(51) Int. Cl.
H04L 27/06 (2006.01)
(52) U.S. Cl. .......................... 375/341; 375/340; 375/316
(58) Field of Classification Search .............. 375/341, 375/340, 316
See application file for complete search history.

(56) References Cited

U.S. PATENT DOCUMENTS

| | | | |
|---|---|---|---|
| 4,520,490 A | 5/1985 | Wei | |
| 4,713,817 A | 12/1987 | Wei | |
| 4,742,533 A | 5/1988 | Weidner et al. | |
| 4,980,897 A | 12/1990 | Decker et al. | |
| 5,048,056 A | 9/1991 | Goldstein | |
| 5,233,629 A | 8/1993 | Paik et al. | |
| 5,233,630 A | 8/1993 | Wolf | |
| 5,329,551 A | 7/1994 | Wei | |
| 5,363,408 A | 11/1994 | Paik et al. | |
| 5,394,440 A | 2/1995 | Goldstein et al. | |
| 5,396,518 A * | 3/1995 | How .......................... | 375/265 |
| 5,406,570 A | 4/1995 | Berrou et al. | |
| 5,408,502 A | 4/1995 | How | |
| 5,442,626 A | 8/1995 | Wei | |
| 5,446,747 A | 8/1995 | Berrou | |
| 5,469,452 A | 11/1995 | Zehavi | |
| 5,497,401 A | 3/1996 | Ramaswamy et al. | |
| 5,511,096 A | 4/1996 | Huang et al. | |
| 5,515,400 A | 5/1996 | Arai | |
| 5,535,228 A | 7/1996 | Dong et al. | |
| 5,541,955 A | 7/1996 | Jacobsmeyer | |
| 5,559,561 A | 9/1996 | Wei | |
| 5,570,391 A | 10/1996 | Lin et al. | |
| 5,621,761 A | 4/1997 | Heegard | |
| 5,633,881 A | 5/1997 | Zehavi et al. | |
| 5,651,032 A | 7/1997 | Okita | |
| 5,740,203 A | 4/1998 | Ramaswamy et al. | |
| 5,757,856 A | 5/1998 | Fang | |
| 5,790,570 A | 8/1998 | Heegard et al. | |
| 5,832,001 A | 11/1998 | Choi | |

(Continued)

OTHER PUBLICATIONS

Jacobs, "Practical Applications of Coding" IEEE Transactions on Info Theory, vol. IT-20, No. 3, May 1974.

(Continued)

*Primary Examiner* — Chieh M Fan
*Assistant Examiner* — Santiago Garcia
(74) *Attorney, Agent, or Firm* — Meschkow & Gresham, P.L.C.

(57) ABSTRACT

A communication system (30) includes a transmitter (32) which generates transmit phase points (54) defined to be the vector sum of two or more QPSK signals (76, 78). Forward error correction encoding (48) is performed independently for the QPSK signals. In a receiver (34) alternate hypotheses are formed about the potential values that might have been transmitted for at least one of the QPSK signals, and offset phase points (68) are defined for each hypothesis. Each offset phase point has the effect of cancelling at least one of the two or more QPSK signals from the combined communication signal (36). Branch metrics (70) are responsive to Euclidean distances between all offset phase points (68) and all noise-free phase points that correspond to the QPSK signal about which no hypotheses are formed. A decoder (72) is configured to accept and reject the hypotheses in addition to counteracting noise.

19 Claims, 19 Drawing Sheets

U.S. PATENT DOCUMENTS

| | | | |
|---|---|---|---|
| 5,848,102 | A | 12/1998 | Zehavi et al. |
| 5,870,414 | A | 2/1999 | Chaib et al. |
| 5,878,085 | A * | 3/1999 | McCallister et al. ......... 375/280 |
| 5,910,967 | A | 6/1999 | Vanderaar |
| 5,920,599 | A | 7/1999 | Igarashi |
| 5,995,551 | A | 11/1999 | McCallister et al. |
| 6,005,897 | A | 12/1999 | McCallister et al. |
| 6,078,625 | A * | 6/2000 | McCallister et al. ......... 375/261 |
| 6,097,764 | A | 8/2000 | McCallister et al. |
| 6,236,685 | B1 | 5/2001 | Oppedahl |
| 6,392,500 | B1 | 5/2002 | McCallister et al. |
| 6,507,628 | B1 * | 1/2003 | McCallister et al. ......... 375/341 |
| 7,782,967 | B2 * | 8/2010 | Cheng et al. ......... 375/260 |
| 2003/0212944 | A1 * | 11/2003 | Kondo et al. ................. 714/779 |
| 2003/0227963 | A1 * | 12/2003 | Dafesh .......... 375/149 |
| 2004/0062298 | A1 * | 4/2004 | McDonough et al. ........ 375/150 |
| 2005/0052991 | A1 * | 3/2005 | Kadous .......... 370/216 |
| 2007/0165699 | A1 * | 7/2007 | Dabak et al. ................. 375/146 |
| 2009/0268787 | A1 * | 10/2009 | Cairns et al. ................. 375/148 |

OTHER PUBLICATIONS

Thomas, Weidner & Durrani, "Digital Amplitude-Phase Keying with M-ary Alphabets", IEEE Transactions on Commun. vol. COM-22, No. 2, Feb. 1974.

Ungerboeck "Channel Coding with Multilevel/Phase Signals" IEEE Transactions on Info Theory, vol. IT-28, No. 1, Jan. 1982.

Ungerboeck, "Trellis-Coded Modulation with Redundant Signal Sets Part I: Intro", IEEE Commun. Mag., vol. 25, No. 2 Feb. 1987.

Ungerboeck, "Trellis-Coded Modulation with Redundant Signal Sets Part II: State of the Art", IEEE Commun. Mag., vol. 25, No. 2 Feb. 1987.

Viterbi, Wolf, Zehavi & Padovani, "A Pragmatic Approach to Trellis-Coded Modulation", IEEE Communications Magazine, Jul. 1989.

Pietrobon, Deng, Lafanechere, Gottfried, Ungerboeck, & Costello, Jr., "Trellis-Coded Multidemensional Phase Modulation", IEEE, vol. 36 No. 1, Jan. 1990.

Costello, Jr., Hagenauer, Imai & Wicker, "Applications of Error-Control Coding", IEEE Transactions on Info Theory, Vol. 44, No. 6, Oct. 1998.

"Turbo Product Code Encoding and Decoding with Quadrature Amplitude Modulation (QAM)", Comtech AHA, Moscow, ID., 2003.

Eleftheriou, Olcer, & Sadjadpour, "Application of Capacity-Approaching Coding Techniques to Digital Subscriber Lines" IEEE Communications Magazine, Apr. 2004.

Miller, "Low Density Parity Check (LDPC) Coding and 8-QAM Modulation in the CDM-600 Satellite Modem", New Forward Error Correction & Modulation Tech., COMTECH, Rev. 4, Jan. 25, 2005.

"Higher-Order Modulation and Turbo Coding Options for the CDM-600 Satellite Modem", COMTECH EF Data, Nov. 7, 2001.

* cited by examiner

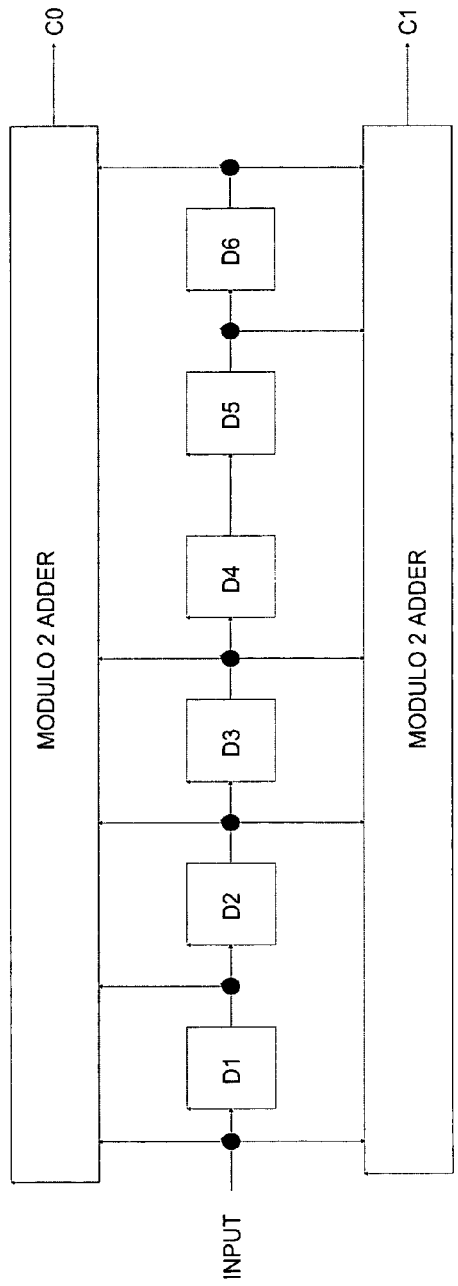
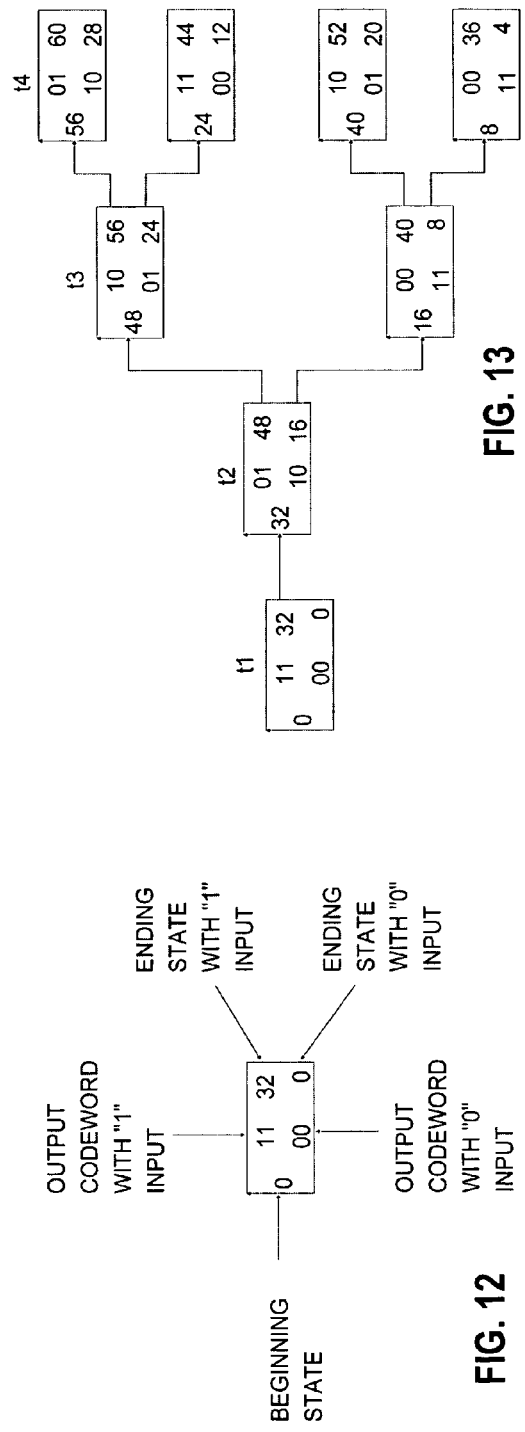
FIG. 11
FIG. 12
FIG. 13

COMMUNICATION METHOD AND APPARATUS

RELATED INVENTION(S)

The present invention claims benefit under 35 U.S.C. 119 (e) to "Pseudo-Orthogonal Forward Error Correction Modulation and Coding Method Using Signal Cancellation," U.S. Provisional Patent Application Ser. No. 60/718,506, filed 19 Sep. 2005, which is incorporated by reference herein.

TECHNICAL FIELD OF THE INVENTION

The present invention relates to the field of digital communications and to the use of forward error correction coding (FEC) in digital communications.

BACKGROUND OF THE INVENTION

The goal of a modern digital communication system design is to send the maximum amount of information possible across a band-limited channel using the least amount of power. Specifically, the designer's goals are to maximize transmission bit rate R, minimize probability of bit error $P_b$, minimize the required bit energy to noise power $E_b/N_0$, and minimize the required system bandwidth W. However, these goals are in conflict with each other which necessitates the trading off of one system goal with another.

Modulation and coding techniques allow the designer to trade-off power and bandwidth to achieve a desired bit error rate (BER). This trade-off is illustrated via a family of $P_b$ versus $E_b/N_0$ curves for the coherent detection, of orthogonal signaling and multiple phase signaling in FIG. 1 and FIG. 2. These signaling schemes are called M-ary because they process k bits per unit interval. The modulator uses one of its $M=2^k$ waveforms to represent each k-bit message sequence.

For orthogonal signal sets (FIG. 1), such as frequency shift keying (FSK) modulation, increasing the size of the symbol set reduces the $E_b/N_0$ required at the expense of more bandwidth. In FSK, different frequencies represent different symbols so the signals are orthogonal. That is, the transmission of one symbol doesn't effect the other symbols and all symbols require the same energy-per-symbol. Increasing the number of symbols increases the number of bits-per-symbol so the energy-per-bit decreases.

For non-orthogonal signal sets (FIG. 2), such as multiple phase shift keying (MPSK) modulation, increasing the size of the symbol set requires an increased $E_b/N_0$. In MPSK, different carrier phase increments represent different symbols. As the number of symbols increases, the spacing between phase increments decrease requiring more energy-per-symbol. Although the bandwidth doesn't increase, the required energy-per-symbol increases more than the bits-per-symbol thus requiring an increase in energy-per-bit.

Another designer option is to reduce power requirements using FEC codes. These codes insert structured redundancy into the source data so that the presence of errors can be detected and corrected. Two categories of FEC codes are block codes and convolutional codes. In the case of block codes, the source data is segmented into blocks of k message bits to which are appended n−k redundant bits to form a n-bit codeword. The ratio of message bits to codewords (k/n) is called the code rate. The code rate is the portion of the codeword that carries message information.

A convolutional code is described by the three integers n, k, and K, where the ratio k/n has the same code rate significance as for block codes. Convolutional codes are not formed into blocks as in block codes, but rather are formed continuously by an encoding shift register. The integer K is called the constraint length and the length of the encoding shift register is equal to K−1.

FEC codes correct some of the errors in the received data which allows a lower power to be used to transmit the data. Coding gain is defined as the reduction, expressed in decibels, in the required $E_b/N_0$ to achieve a specified error performance of a FEC coded system over an un-coded one with the same modulation. The coding performance for coherently demodulated BPSK over a Gaussian channel for several block codes is illustrated in FIG. 3 and for various convolutional codes in FIG. 4.

Block codes and convolutional codes achieve an improvement in BER by bandwidth expansion. That is, a k-bit message sequence is replaced by a n-bit codeword. To achieve the same message bit rate, the channel bandwidth would have to be increased by n/k.

Trellis-coded modulation (TCM) combines modulation and coding schemes to achieve coding gain without a bandwidth expansion. Redundancy is provided by increasing the signal alphabet through multilevel/phase signaling, so the channel bandwidth is not increased.

FEC coding is a mature field of communications technology. Many types of codes have been developed which are sometimes combined to achieve various performance goals. Previously, Viterbi convolutional codes combined with Reed-Solomon block codes have provided what were at one time viewed as being acceptable coding gains. But, the conventional TCM schemes and the convolutional encoding schemes failed to achieve the higher levels of performance that are now provided through the use of turbo codes. Turbo codes are two or higher dimensional block codes that use an iterative feedback decoding scheme. Unfortunately, turbo codes require processing over an extended time before final decisions are produced and therefore cause the communication system to experience undesirably lengthy latency periods. It is believed that the conventional TCM and convolutional encoding schemes failed to achieve the higher levels of performance due, at least in part, to an excessive sensitivity to small Euclidean distances (ED's) between nearest-neighbor phase points in a phase constellation.

SUMMARY OF THE INVENTION

It is an advantage of at least one embodiment of the present invention that an improved communication method and apparatus are provided.

Another advantage of at least one embodiment of the present invention is that an apparatus and method for implementing digital communications using FEC coding are provided to achieve performance which matches or exceeds that of currently available codes in some applications.

Another advantage of at least one embodiment of the present invention is that a code made up of pseudo-orthogonal signals is transmitted so that the pseudo-orthogonal signals may be separated from one another in a receiver.

Another advantage of at least one embodiment of the present invention is that a phase-point constellation is compiled so that pseudo-orthogonal signals may be separated from one another in a receiver to lower sensitivity to Euclidean distances between nearest-neighbor points in the constellation.

Another advantage of at least one embodiment of the present invention is that performance on par with or exceeding that which is achievable through the use of turbo codes is achieved without causing the communication system to suffer from the excessive latency times which are characteristic of turbo codes.

These and other advantages are realized in one form by a method for communicating an n-bit codeword in a unit interval, where n=y+z and where n, y, and z are positive integers. The method calls for transmitting a transmit phase point selected from a constellation of phase points. A receive phase point responsive to the transmit phase point and to noise is generated. $2^z$ alternate hypotheses about potential combinations of the z bits of the n-bit codeword are formed. One of the $2^z$ hypotheses is correct and $2^z-1$ of the $2^z$ hypotheses are incorrect. A decoding process is applied to the $2^z$ alternate hypotheses to accept and reject the hypotheses in addition to counteracting the noise.

The above and other advantages are realized in another form by a receiver for use in a communication system in which a codeword transformed into a transmit phase point is transmitted during a unit interval. The receiver includes a receive phase point generator configured to generate a receive phase point responsive to the transmit phase point and to noise. A branch metrics generator is configured to define a plurality of offset phase points. Each of the offset phase points is responsive to the receive phase point. The branch metrics generator generates branch metrics that are responsive to the offset phase points. A decoder couples to the branch metrics generator.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 11 shows a block diagram of an FEC encoder configured as a rate ½ Viterbi code generator with a constraint length of 7;

FIG. 12 shows a notational scheme which corresponds with the operation of the FEC encoder depicted in FIG. 11;

FIG. 13 shows a tree diagram which illustrates the codewords and states for the first four input bits, assuming the shift register starts at the all zeros state;

DETAILED DESCRIPTION OF THE PREFERRED EMBODIMENTS

Those skilled in the art will appreciate that the dimensionless ratio $E_b/N_0$ is a standard quality measure for digital communication system performance. The ratio $E_b/N_0$ can be evaluated as a metric that characterizes the performance of one system versus another. The smaller the required $E_b/N_0$ for a communication system, the more efficient the system modulation and detection process is for a given probability of error. Orthogonal signaling provides a lower $E_b/N_0$ at the expense of additional bandwidth. Multi-phase and multi-level signaling do not require additional bandwidth but require a higher $E_b/N_0$.

Quadrature phase shift keying (QPSK), however, allows a higher data rate compared to bi-phase shift keying (BPSK) without an increase in either bandwidth or $E_b/N_0$. It achieves this quality because the two signal components of QPSK are orthogonal. That is, the data rate doubles going from BPSK to QPSK without an increase in either bandwidth or $E_b/N_0$. QPSK signaling can be thought of as transmitting two independent BPSK signals in quadrature. Since the two signals are orthogonal, the detection of one BPSK signal does not interfere with the detection of the other quadrature BPSK signal.

The below-presented discussion about preferred embodiments of the present invention may be viewed as extending this BPSK to QPSK process further such that two independent QPSK signals could be combined in such a way that the detection of one QPSK signal would not interfere with the detection of the other QPSK signal. That is, in effect the two QPSK signals may be viewed as being pseudo-orthogonal to each other.

In one example, two QPSK signals are combined to produce a 16-point quadrature amplitude modulation (16-QAM) constellation. The signals are coded and combined in a manner that allows them to be separated in the demodulation and decoding process. In effect, the presence of the second QPSK signal doesn't interfere with the first QPSK signal and vice versa. That is, the signals are made pseudo-orthogonal via the encoding and decoding process.

This technique can also be applied to create higher order pseudo-orthogonal constellations. The natural extension is to combine 3 QPSK signals into 64-QAM and 4 QPSK signals into 256-QAM.

Figure 2:
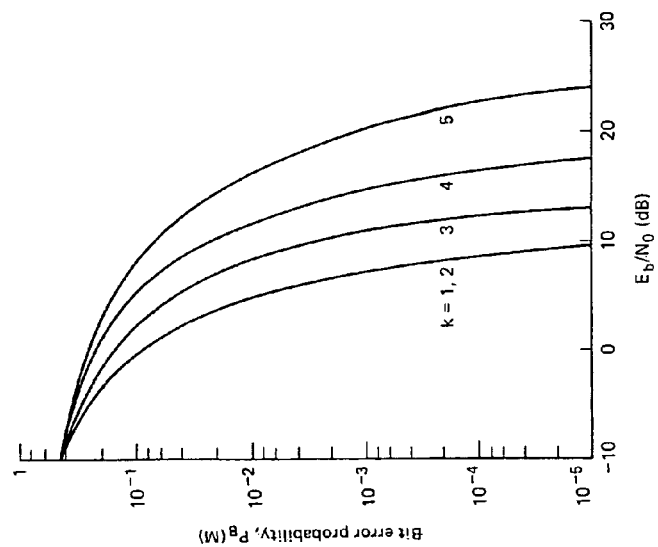
FIG. 2 shows a graph depicting $E_b/N_o$ versus bit error probabilities for MPSK modulation.
Figure 1:
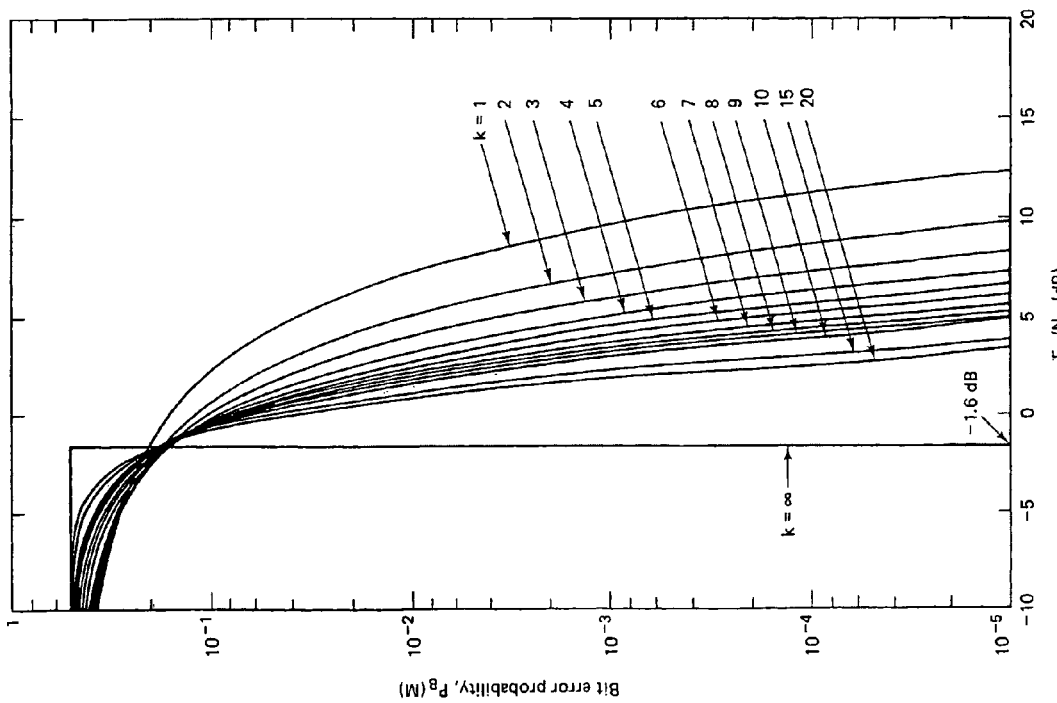
FIG. 1 shows a graph depicting $E_b/N_o$ versus bit error probabilities for FSK modulation.
Figure 4:
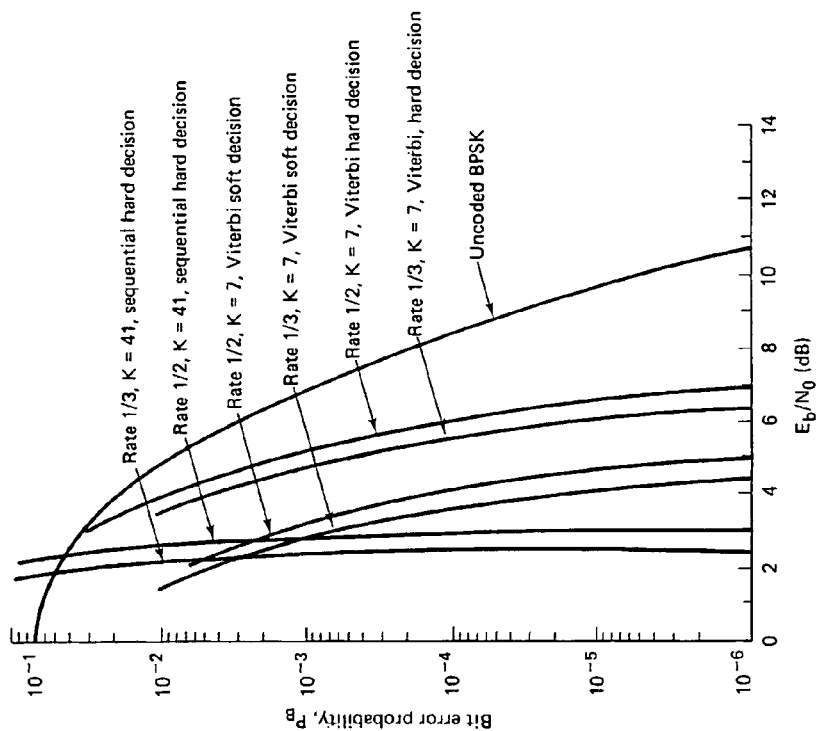
FIG. 4 shows a graph depicting $E_b/N_o$ versus bit error probabilities for the transmission of coherently demodulated BPSK over a Gaussian channel using various convolutional codes.
Figure 3:
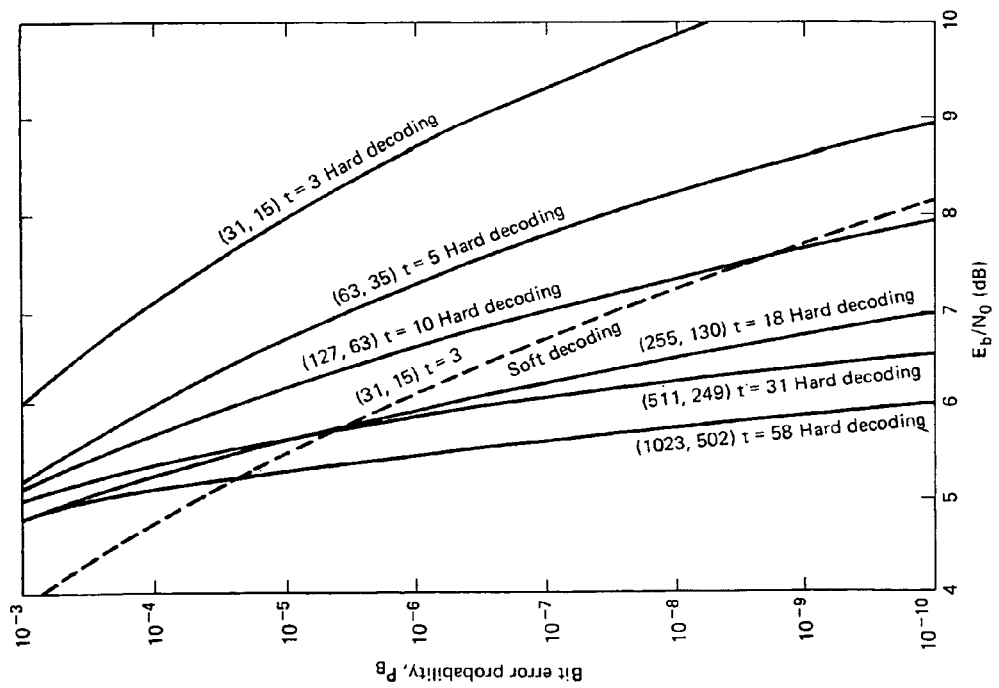
FIG. 3 shows a graph depicting $E_b/N_o$ versus bit error probabilities for the transmission of coherently demodulated BPSK over a Gaussian channel using various block codes.
Figure 5:
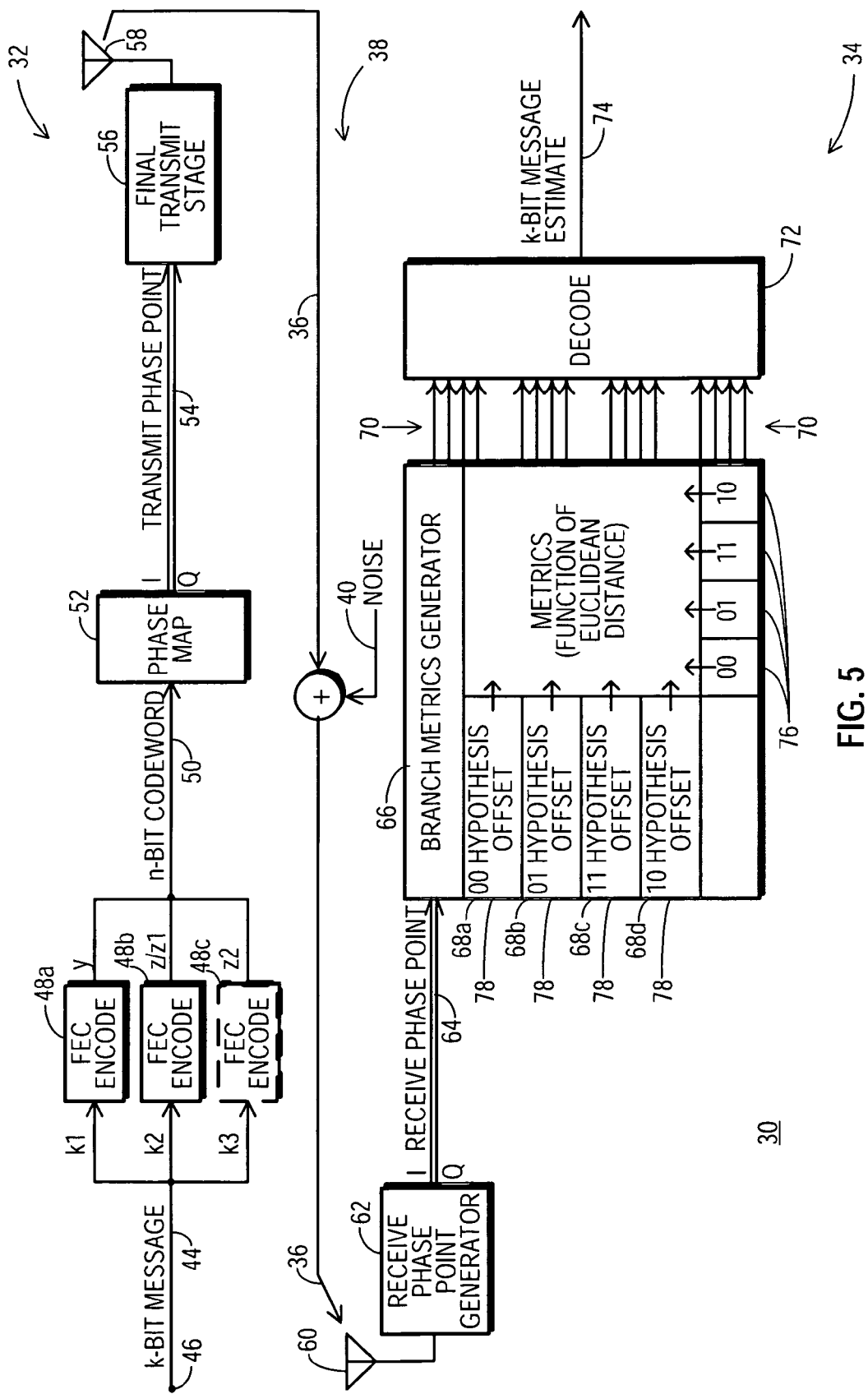
FIG. 5 shows a block diagram of one embodiment of a communication system configured in accordance with the teaching of the present invention.

FIG. 5 shows a block diagram of one embodiment of a communication system 30 configured in accordance with the teaching of the present invention. As shown in FIG. 5, communication system 30 includes a transmitter 32 and a receiver 34. A communication signal 36 is applied by transmitter 32 to a channel 38 where it is invariably corrupted by noise 40, assumed to be additive Gaussian white noise (AGWN) herein, then obtained from the channel by receiver 34. While the preferred embodiment is specifically configured for a radio-frequency (rf) communication channel 38, communications through other types of channels 38 may also benefit from the teaching of the present invention. For example, channel 38 may alternatively convey signals acoustically, magnetically, or optically; or, channel 38 may be provided by a memory device to which data are written (transmitted), then later read (received).

Figure 6:
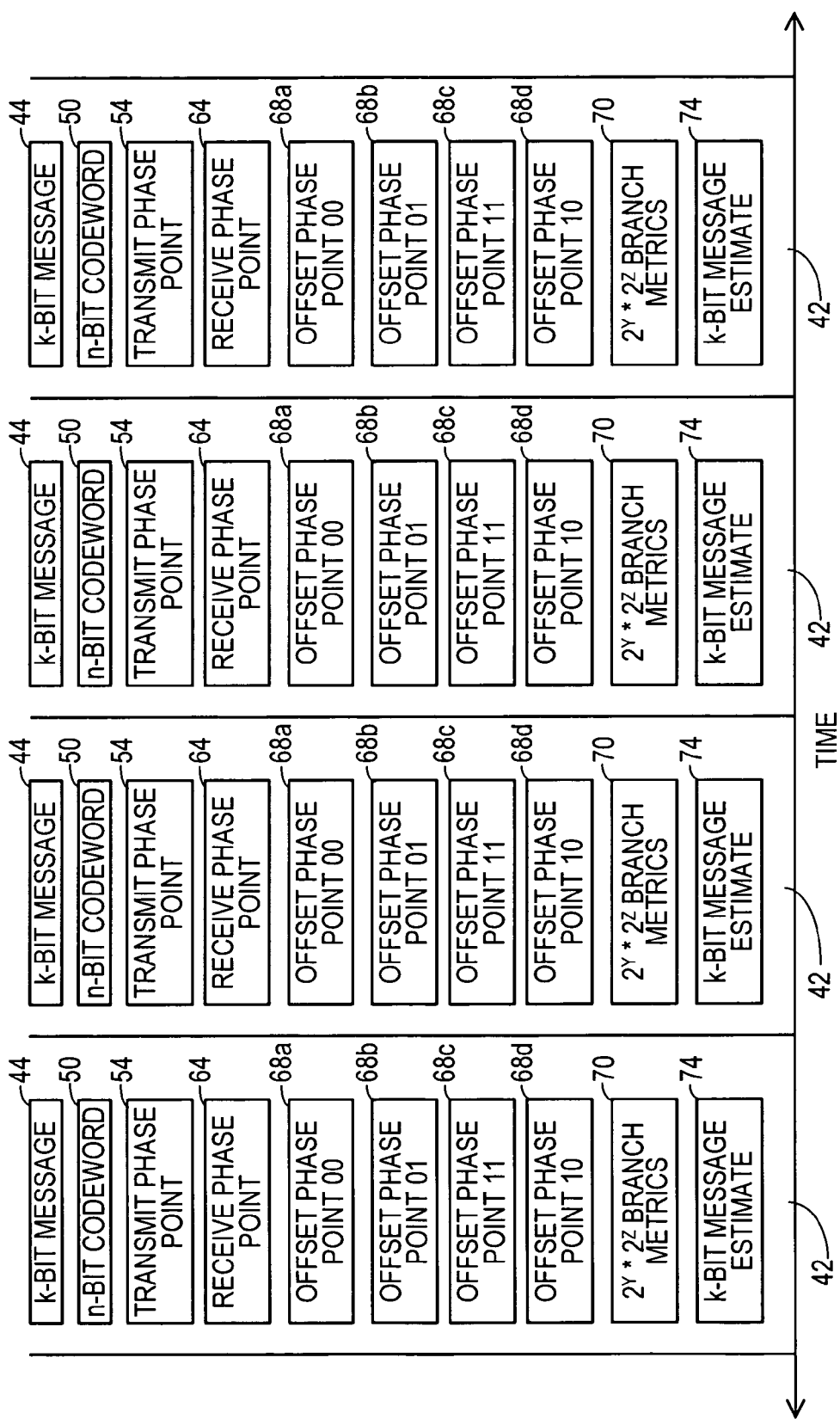
FIG. 6 shows a time line of objects that are generated in the communication system of FIG. 5 over the course of successive unit intervals.

FIG. 6 shows a time line of signal and/or data objects that are generated in communication system 30 over the course of successive unit intervals 42. Referring to FIGS. 5 and 6, during each unit interval 42, transmitter 32 receives a data message 44 at a terminal 46. Message 44 is the data that is to be conveyed through channel 38. And, message 44 is received at a rate of k bits per unit interval 42, where k is a positive integer. Transmitter 32 parses k-bit message 44 into two or more message streams, and routes the two or more message streams to independent, forward error correction (FEC) encoders 48. During each unit interval, encoders 48 collectively, but independently, convert a k-bit message 44 into an n-bit codeword 50, where n is a positive integer greater than k. Collectively, encoders 48 increase the data rate by adding systematic redundancy bits. Encoders 48 are discussed below in more detail.

During each unit interval 42, a phase mapping section 52 transforms an n-bit codeword 50 into a single complex transmit phase point 54 having in-phase (I) and quadrature-phase (Q) components. Transmit phase point 54 is selected from a constellation of phase points that are configured in a manner that is discussed in more detail below. Further, during each unit interval 42, a transmit phase point 54 is presented to a final transmit stage 56 where the transmit phase point 54 is processed for and applied to channel 38. Final transmit stage 54 may implement any of the variety of digital and analog processing tasks that are known to those skilled in the art, including upconversion to an RF frequency, band-pass filtering, power amplification, and broadcasting communication signal 36 from an antenna 58 into channel 38.

Communication signal 36, which is invariably corrupted with noise in channel 38 and the front end of receiver 34, is received at an antenna 60 of receiver 34. Antenna 60 couples to receive phase point generator 62, which serves as an initial receive stage of receiver 34. Receive phase point generator 62 performs conventional processing on communication signal 36 so as to produce a receive phase point 64 during each unit interval 42. This processing may include RF amplification, band-pass filtering, downconversion, equalization, frequency and phase synchronization, bit synchronization, digitization, and the like. Receive phase point 64 is a complex digital value having in-phase (I) and quadrature-phase (Q) components.

Ideally, each receive phase point 64 corresponds to a transmit phase point 54, an n-bit codeword 50, and a k-bit message 44, although it will be displaced in time. A receive phase point 64 will be displaced in time from its corresponding transmit phase point 54 due to processing in final transmit stage 56, propagation delay in channel 38, and processing in receive phase point generator 62. But a receive phase point 64 will invariably fail to precisely equal its corresponding transmit phase point 54 due in large part to the presence of noise 40. A receive phase point 64 will be displaced further in time from its corresponding n-bit codeword 50 due to processing in phase map 52, and displaced even further in time from a corresponding k-bit message 44 by processing in encoders 48.

During each unit interval 42, a receive phase point 64 is presented to a branch metrics generator 66. Branch metrics generator 66 performs two tasks in response to each receive phase point 64. Branch metrics generator 66 may be implemented using a memory device programmed to carry out the below-discussed features. Thus, both of these two tasks may take place in a single table-look-up operation, and both tasks can be performed implicitly through the relationships of the data programmed in the memory device. The two tasks are performed together through the relationships of input to output data programmed in the memory device.

In a first task, branch metrics generator 66 forms alternate hypotheses concerning a portion of the n-bit codeword 50 that corresponds to the receive phase point 64. Alternate hypotheses are formed to account for all potential combinations of z bits of the corresponding n-bit codeword 50, where z is a positive integer less than n. $2^z$ hypotheses are formed to correspond to all potential bit combinations of the z bits, and only one of the $2^z$ hypotheses is correct. The remaining $2^z-1$ hypotheses are incorrect. But at this point in the process of decoding the n-bit codeword 50, it is unknown which one of the $2^z$ hypotheses is the correct one and which ones are incorrect. The $2^z$ alternate hypotheses are formed by offsetting receive phase point 64 by $2^z$ different offset vectors, as is discussed in more detail below. For an example where the integer z equals two, this first task defines offset phase points 68a, 68b, 68c, and 68d. But there is no requirement that the integer z must equal two.

In a second task, branch metrics generator 66 generates branch metrics 70. Branch metrics 70 may be formed in roughly a conventional manner but with a couple of exceptions. Conventional branch metrics would describe probabilities of various transmit phase points having been transmitted given the fact that a particular receive phase point had been received. But branch metrics generator 66 does not generate such probabilities, as is discussed in more detail below. On the other hand, branch metrics generator 66 does generate branch metrics 70 that describe probabilities, and the probabilities are based on Euclidean distances (ED's).

For the purpose of this discussion, let y be a positive integer such that n=y+z. Thus, y represents the number of bits in n-bit codeword 50 about which no hypotheses are formed as discussed above in connection with the first task of branch metrics generator 66. As will be discussed in more detail below, each receive phase point 64 equals the vector sum of a first signal which is responsive to y bits of the n-bit codeword 50, a second signal which is responsive to z bits of the n-bit codeword 50, and noise 40. Branch metrics generator 66 generates branch metrics 70 to be responsive to ED's between $2^y$ potential values of the first signal and the above-discussed $2^z$ offset phase points 68. A total of $2^y$ of branch metrics 70 are generated for each of the $2^z$ offset phase points 68, so that $2^{y+z}$ branch metrics 70 are generated during each unit interval 42.

Branch metrics 70 may be expressed as linear-likelihoods or as log-likelihoods. And in practice, branch metrics 70 may be configured so that larger ED's, which suggest lower probabilities, lead to larger branch metric 70 values, or configured so that smaller ED's, which suggest higher probabilities, lead to larger branch metric 70 values. But for the sake of consistency, in the discussion below, larger metrics will be associated with larger residuals and lower probabilities.

During each unit interval 42, branch metrics 70 are presented to a decoder 72. A variety of decoding techniques may be applied in decoder 72, and a few are discussed in more detail below. In general, the FEC encoding processes performed by encoders 48 and the redundancy bits added by encoders 48 allow decoder 72 to accumulate the probabilities defined by branch metrics generator 66 over many unit intervals 42 and select most-likely paths for use in providing an estimate 74 of k-bit message 44. The k-bit message estimate 74 is based on both the particular receive phase point 64 which corresponds most directly to the k-bit message 44 that is being estimated and the immediate history of offset phase points 68.

Due to the use of offset phase points 68 defined in branch metrics generator 66, decoder 72 decodes a collection of offset phase points 68 rather than a single receive phase point 64. In particular, decoder 72 functions to accept and reject the alternate hypotheses posed by offset phase points 68 in addition to the traditional role of counteracting noise 40. As will become evident from the below-presented discussion, in any given unit interval 42 offset phase points 68 which result from incorrect hypotheses will, on average, lead to large residual values. Often, these residuals values will be quite large. Thus, offsets 68 resulting from incorrect hypotheses appear to decoder 72, on average over a series of several unit intervals 42, as though they are far too distant in phase space from a comparison point to suggest valid data.

Figure 7B:
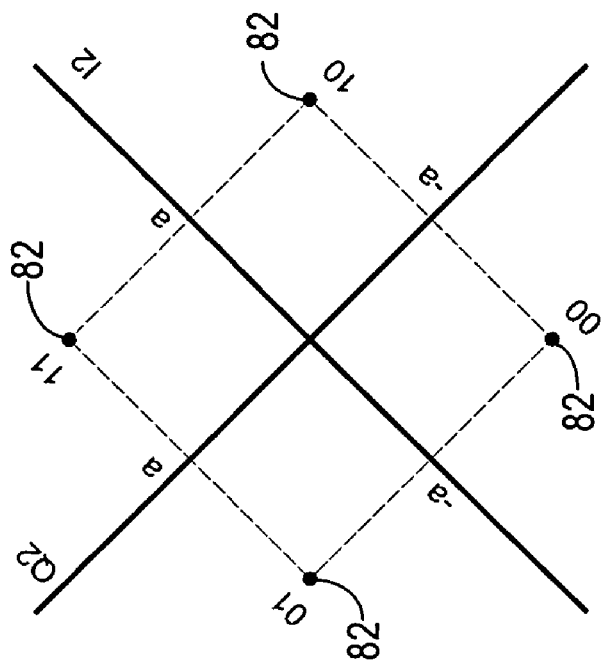
FIGS. 7A and 7B graphically show two independent QPSK signals that are vector-added together to achieve a phase point constellation consistent with the teaching of the present invention.
Figure 7A:
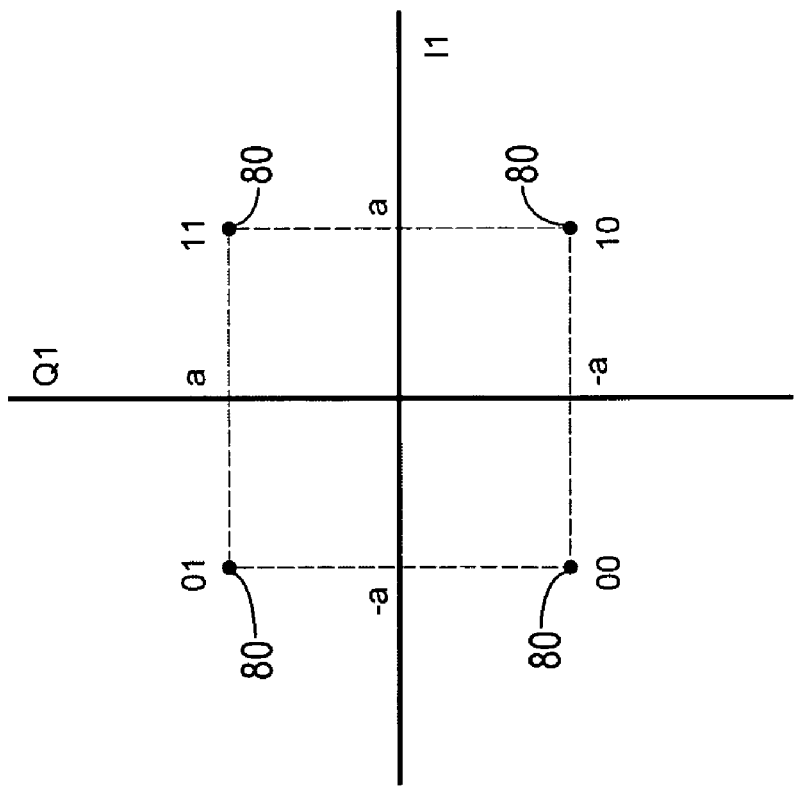

In general, transmitter 32 combines lower order constellations into a higher order constellation in such a manner that the lower order constellations appear orthogonal in decoder 72. FIGS. 7A and 7B illustrate one example in which two QPSK signals 76 and 78 can be combined by vector, or complex, addition to achieve this goal. Those skilled in the art will appreciate that vector addition is a linear process that allows the two signals to be separated from one another by a complementary linear process of vector, or complex, subtraction in branch metrics generator 66 of receiver 34.

FIGS. 7A and 7B illustrate that the axes of second QPSK signal 78 are rotated 45 degrees with respect to first QPSK signal 76. Each of QPSK signals 76 and 78 exhibit, during any single unit interval 42, one of four potential values, depicted as points 80 for signal 76 in FIG. 7A and points 82 for signal 78 in FIG. 7B. Points 80 and 82 are also referred to as symbols herein. The four potential values for points 80 or for points 82 exhibit equal magnitudes, and each value is rotated 90 degrees from two other ones of the four potential values.

Figure 8B:
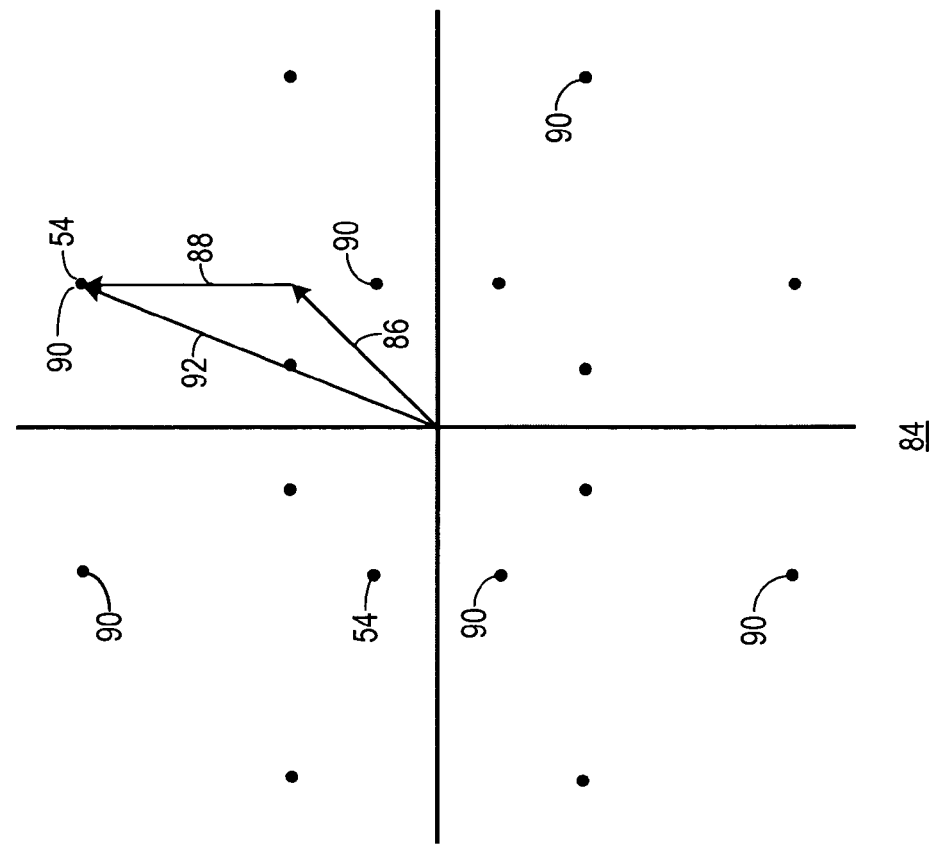
FIGS. 8A and 8B graphically show a 16-QAM phase point constellation that results from the vector summation of all possible values for the two independent QPSK signals depicted in FIGS. 7A and 7B.
Figure 8A:
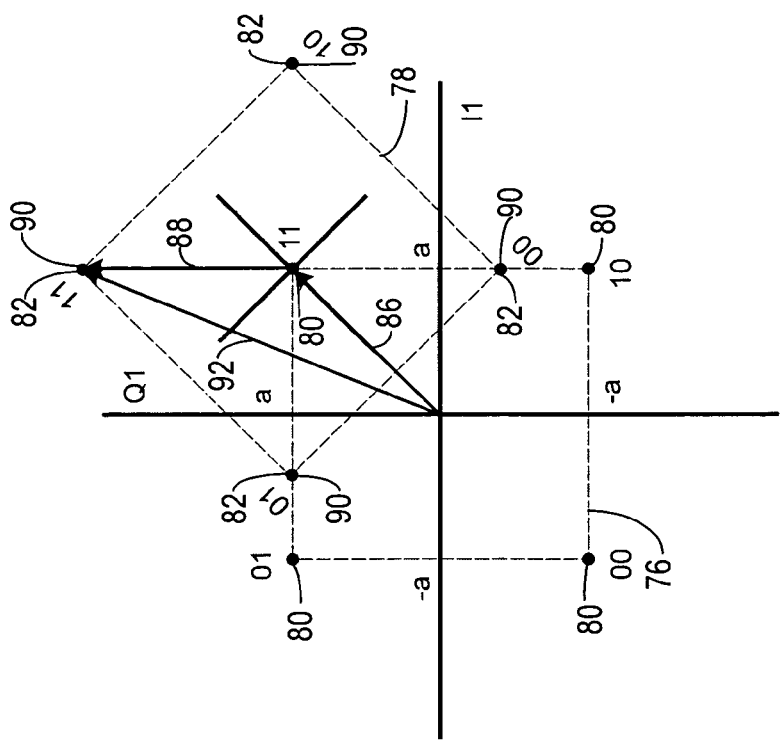

FIGS. 8A and 8B graphically show a 16-QAM phase point constellation 84 that results from the vector summation of all possible values for the two independent QPSK signals 76 and 78 individually depicted in FIGS. 7A and 7B. In effect, the vector addition of second QPSK signal 78 to first QPSK signal 76 causes the origin of the rotated I2Q2 axis for signal 78 to be placed at each symbol in the I1Q1 sub-constellation of signal 76. FIG. 8A illustrates the vector addition of all potential values for second QPSK signal 78, to the "11" point 80 in the I1Q1 sub-constellation of signal 76, depicted as a phase-space vector 86. FIG. 8A also illustrates a phase-space vector 88 extending from the I2Q2 origin to the "11" point 82 in the I2Q2 sub-constellation of signal 78. The result of the vector addition process is the phase point 90, depicted by a phase-space vector 92, which results from adding a value of "11" for first QPSK signal 76 and a value of "11" for second QPSK signal 78. Similarly adding the I2Q2 origin to the other three symbols in the I1Q1 constellation creates the 16-QAM constellation 84 shown in FIG. 8B. Phase points 90 serve as transmit phase points 54.

Thus, each of phase points 80 defines its own phase-space vector 86 with respect to the origin of its constellation, and each of phase points 82 defines its own phase-space vector 88 with respect to the origin of its constellation. Each phase point 90 in constellation 84 is likewise characterized by its own phase-space vector 92. In the preferred embodiment, each of phase-space vectors 86 exhibits substantially equal magnitude to phase-space vectors 88, but this is not a requirement. Equal magnitude phase-space vectors 86 and 88 prevent branch metric calculations from being dominated by the influence of a smaller magnitude phase-space vector.

For each 16-QAM symbol received at receiver 34, $2^z$ hypotheses are made in branch metrics generator 66 as to which I2Q2 symbol was transmitted and that symbol is effectively subtracted or cancelled from receive phase point 64 to form offset phase points 68. In effect, this converts 16-QAM constellation 84 back to the original I1Q1 QPSK sub-constellation of signal 76. In other words, for each hypothesis about which I2Q2 symbol was transmitted, the interference of the I2Q2 symbol is removed from the I1Q1 symbol.

Figure 9B:
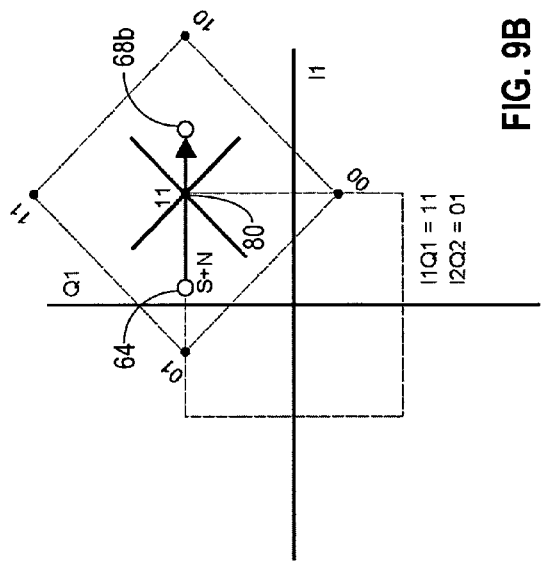
FIGS. 9A-9D graphically illustrate the cancellation of a second QPSK signal from a signal defined by a 16-QAM phase point constellation which results from the vector addition of the second QPSK signal to a first QPSK signal.
Figure 9C:
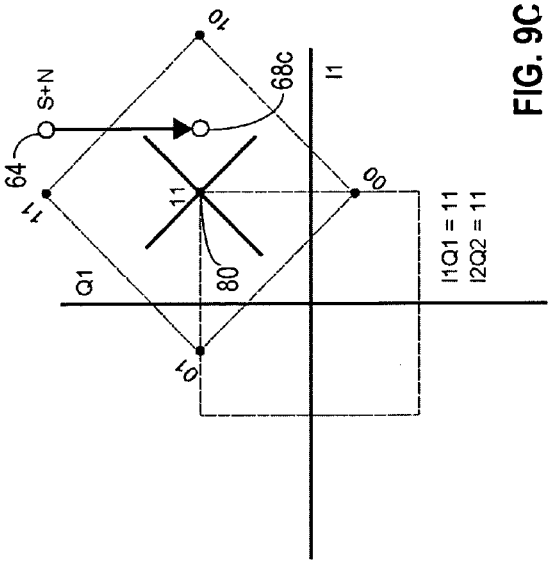
Figure 9A:
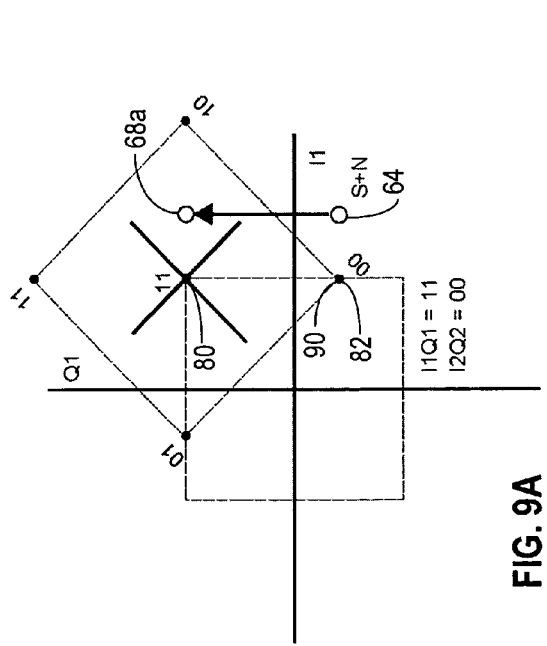
Figure 9D:
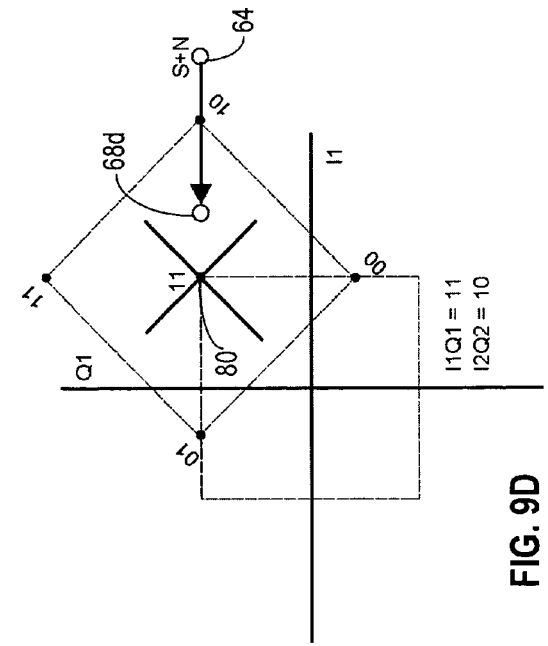

FIGS. 9A-9D graphically illustrate the cancellation of each of the I2Q2 symbols for second QPSK signal 78 for arbitrary examples of received phase points 64. This cancellation task produces offset phase points 68. For example, referring to FIG. 9A, assume that the I1Q1="11" symbol 80, I2Q2="00" symbol 82 was transmitted and noise 40 placed the corresponding receive phase point 64 slightly to the right of the noise-free symbol location. For the hypothesis where branch metrics generator 66 assumes the I2Q2 symbol 82 transmitted was "00", which is the correct hypothesis in this example, the signal voltage due to a "00" symbol 82 is removed or cancelled from the receive phase point 64 by a vector addition operation to produce offset phase point 68a. This cancellation task places offset phase point 68a at the same point, with respect to the I1Q1="11" symbol 80, as it would have been had only the I1Q1 symbol 80 been transmitted. In effect, I2Q2 signal 78 is removed and the received signal reverts back to the original I1Q1 QPSK signal 76. FIGS. 9B-9D illustrate the received signal voltage movements for examples of receive point 64 with equivalent noise components. The FIGS. 9B-9D examples are for when the other three I2Q2 symbols are cancelled in accordance with other ones of the $2^z$ hypotheses to form offset phase points 68b, 68c, and 68d.

Figure 10B:
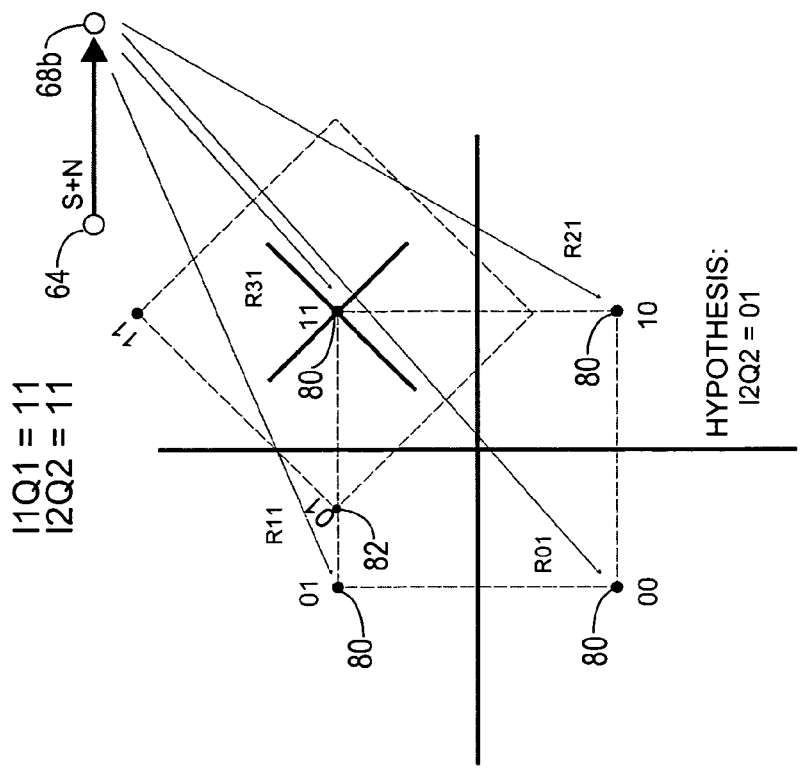
FIGS. 10A-10D graphically illustrate offset phase points which result from a cancellation task when incorrect hypotheses are formed concerning the second QPSK signal.
Figure 10A:
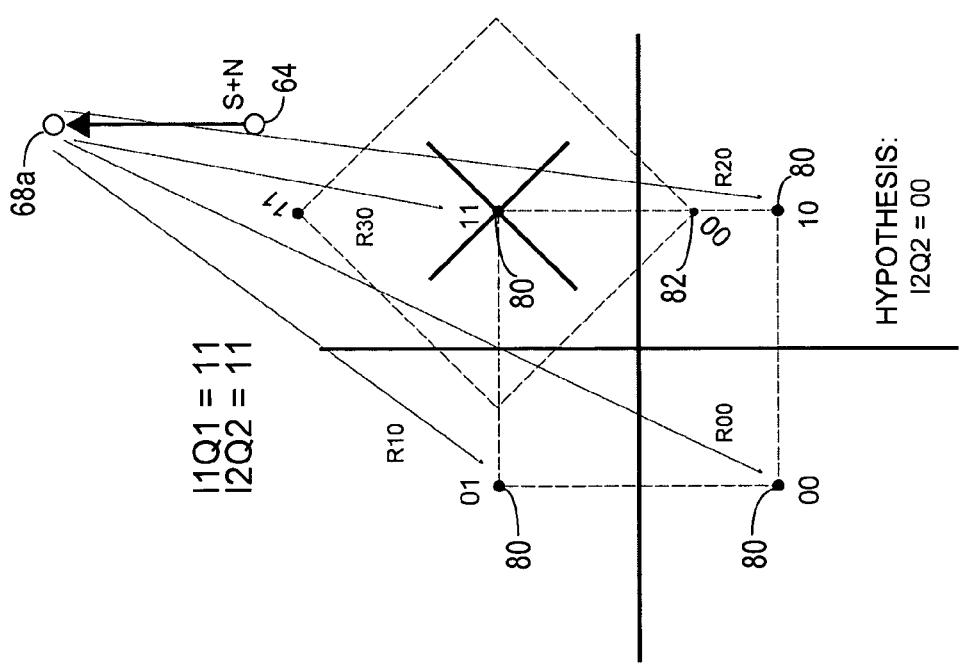

FIGS. 10A-10D graphically illustrate the offset phase points 68 which result from the cancellation task in branch metrics generator 66 when incorrect hypotheses are formed concerning which symbol 82 was transmitted for second QPSK signal 78. FIGS. 10A-10D are directed to the 16-QAM example also depicted in FIGS. 8-9. Referring to FIG. 10A, assume that the I1Q1="11" symbol 80, I2Q2="11" symbol 82 was transmitted. Also assume that noise 40 placed receive phase point 64 slightly to the right and above the noise-free symbol location. When branch metrics generator 66 forms the incorrect hypothesis that the I2Q2="00" symbol 82 was transmitted, then the signal voltage due to a I2Q2="00" symbol 82 is removed, in effect, which places the resulting offset phase point 68a further above the I1Q1 constellation.

The error residuals associated with this incorrectly placed offset phase point 68 are defined as the distance from the offset phase point 68 to each of the correct I1Q1 symbols 80. That is, the residual from the I1Q1="01" symbol 80, based on the hypothesis that the I2Q2="00" symbol 82 was transmitted, is designated R10 and is defined as the Euclidean distance (ED) between offset phase point 68a, which results from a vector addition operation that cancels the I2Q2="00" symbol 82 from the receive phase point 64 in accordance with that hypothesis, and the I1Q1="01" symbol 80. For each unit interval 42, branch metrics generator 66 generates a single metric 70 which is a function of this residual. FIG. 10A also shows residuals R00, R20, and R30 which are defined in branch metrics generator 66 to characterize ED's from offset phase point 68a and the other potential values for symbol 80. Corresponding branch metrics 70 are generated during each unit interval 42.

Figure 10C:
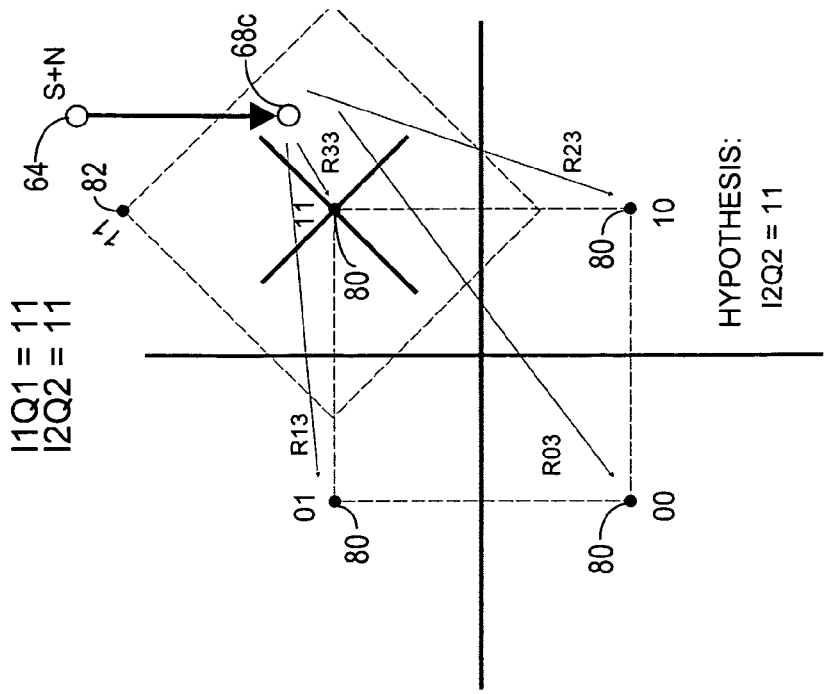
Figure 10D:
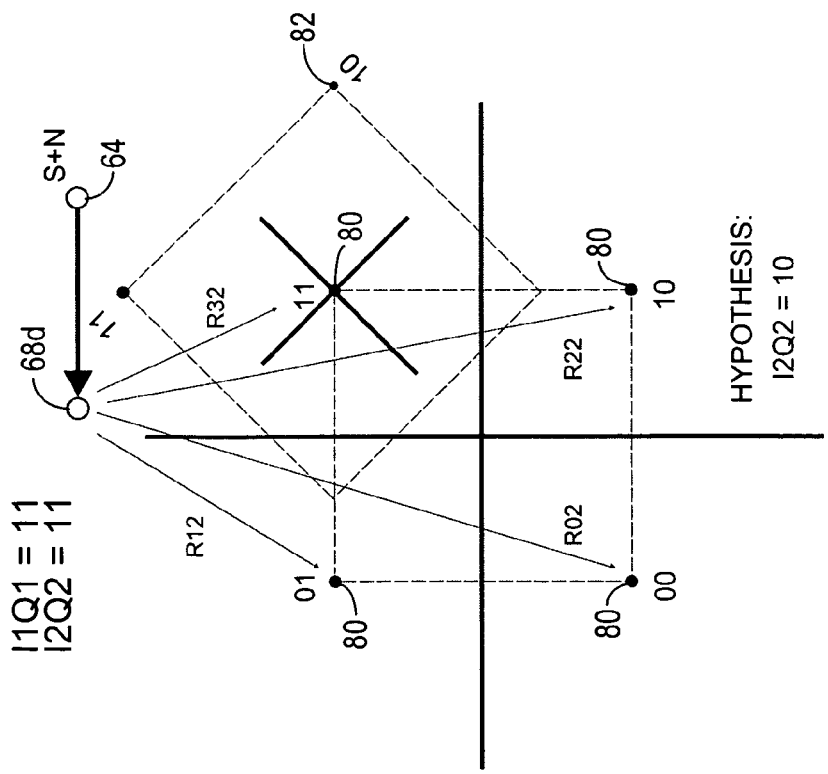

Referring to FIGS. 10A-10D, in a like manner the residuals to each of the $2^y$ I1Q1 symbols 80 are calculated based on the $2^z$ offset phase points 68 which are defined as a result of the alternate hypotheses formed based on the $2^z$ different symbols 82 that may be transmitted for the I2Q2 signal 78. FIG. 10B depicts residuals R01, R11, R21, and R31 which are defined in branch metrics generator 66 to characterize ED's from offset phase point 68b and all potential values for symbol 80. FIG. 10C depicts residuals R03, R13, R23, and R33 which are defined to characterize ED's from offset phase point 68c and all potential values for symbol 80. And, FIG. 10D depicts residuals R02, R12, R22, and R32 which are defined to characterize ED's from offset phase point 68d and all potential values for symbol 80. $2^{y+z}$, which equals 16 for the 16-QAM example of FIGS. 10A-10D, residuals are defined. In this example, the smallest residual is R33 (FIG. 10C) which results from the only correct one of the $2^z$ alternate hypothesis.

In coding, n–k redundancy bits are added to a k-bit message 44 to produce an n-bit codeword 50 which is transmitted by transmitter 32. Only a portion of all the possible n-bit sequences are codewords 50. At receiver 34, noise 40 may corrupt the received n-bit sequence 50 into a sequence that is not a codeword. This alerts receiver 34 that the received n-bit sequence is in error. To correct the error, decoder 72 in receiver 34 selects the n-bit codeword 50 that is "closest" to the received n-bit sequence and extracts the k-bit message estimate 74. As long as the received n-bit sequence is closer to the correct codeword 50, than any other codeword, the k-bit message 44 will be received error-free.

Coding allows receiver 34 to determine which I2Q2 symbol 82 was added to make the 16-QAM symbol 90 and therefore which symbol 82 needs to be canceled to convert the 16-QAM symbols back to I1Q1 QPSK symbols 80. In other words, coding allows receiver 34 to accept and reject the $2^z$ alternate hypotheses defined by branch metrics generator 66. Either block codes or convolutional coding could be used.

FIG. 11 shows a block diagram of an FEC encoder 48 configured as a rate ½ Viterbi code generator with a constraint length of 7. Those skilled in the art will appreciate that encoders 48 are not limited to only this configuration but that a wide variety of convolutional and block FEC encoding schemes may be implemented in accordance with the teaching of the present invention. To generate the convolutional code in encoder 48, sequential input bits from k-bit message 44 are shifted through a 6-bit shift register and a combination of shift register bits are added in two modulo-2 adders. For each input bit, a 2-bit output codeword is produced. The state of the code is defined by the state of the shift register. Since this shift register has six registers, there are $2^6=64$ code states. Each input to the generator produces a codeword and a new ending state, based on the input bit and the beginning state.

FIG. 12 shows a notational scheme which corresponds with the operation of an FEC encoder 48 which implements a rate ½ Viterbi code generator with a constraint length of 7. The rectangular shaped box in FIG. 12 defines the codeword and ending state based on the beginning state for an input bit of either "0" or "1".

FIG. 13 shows a tree diagram which illustrates the codewords and states for the first four input bits to encoder 48, assuming the shift register starts at the all zeros state. For example, if the first input bit is a "0", the first codeword is "00" and the ending state is "0". If a "1" is input, the codeword is "11" and the ending state is "32" or "100000" in binary notation.

The Viterbi decoding algorithm is well known and will not be repeated in detail here. In general, in accordance with the Viterbi decoding algorithm, a trellis diagram is constructed which defines all the possible states, codewords, and branches. Whenever paths in the trellis merge to a particular state, the path with the largest metric (least probable) can be eliminated. The path metric is computed by adding the individual error residuals or branch metrics between the currently received codeword (symbol) and the branch codeword for all branches that make up that path. The final surviving path with the smallest metric defines the most probable transmitted codewords. The message bits are extracted as part of the decoding algorithm.

Figure 14:
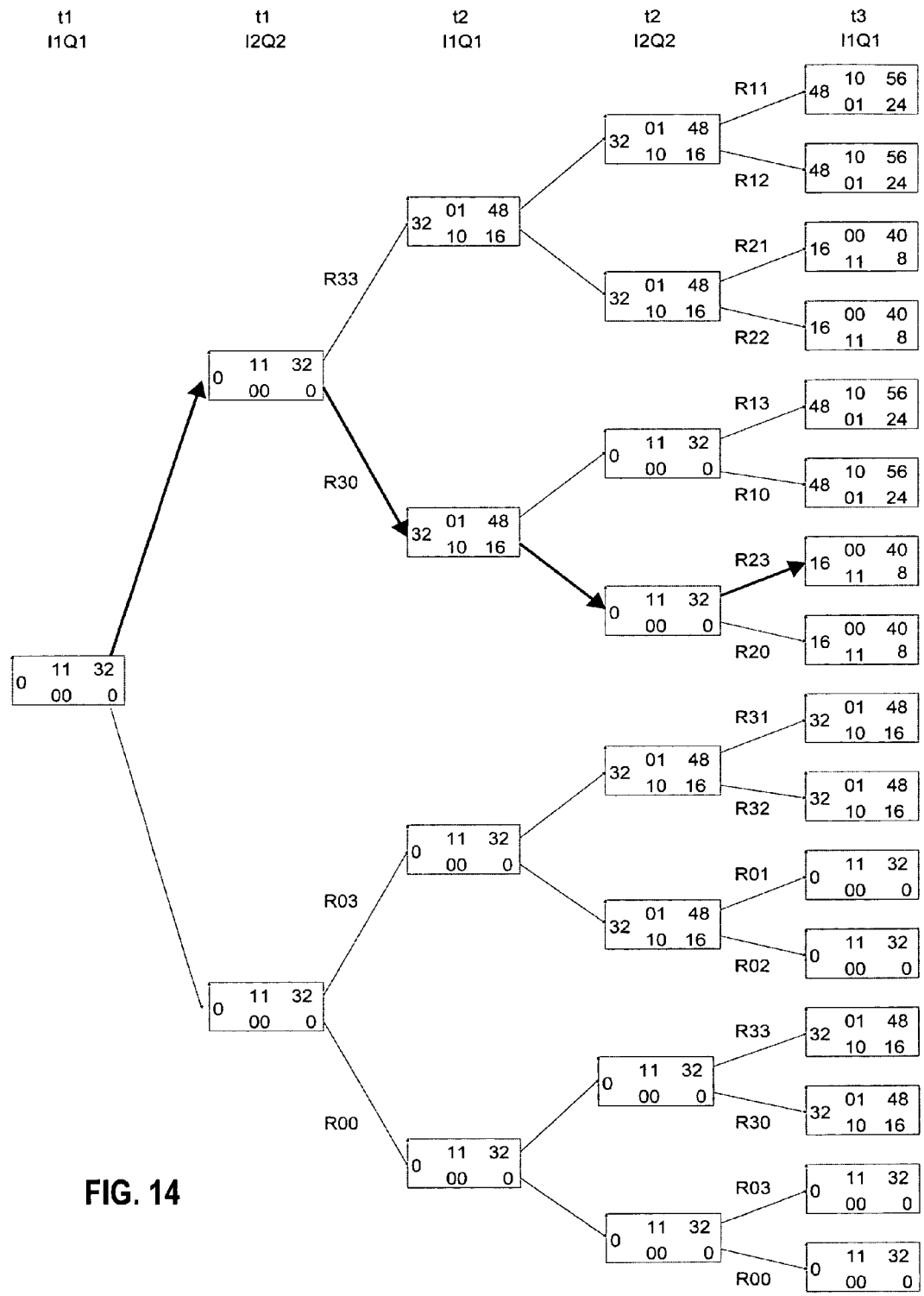
FIG. 14 shows a tree diagram that indicates how two QPSK signals are independently encoded and yet form a common code tree.

FIG. 14 shows a tree diagram that indicates how two QPSK signals are independently encoded and yet form a common code tree. A first FEC encoder 48a is used to encode the I1Q1 symbols 80 and a second FEC encoder 48b for the I2Q2 symbols 82. More specifically, encoder 48a converts a k1-bit message into a y-bit codeword by following a first encoding process, such as the rate ½, K=7, convolutional encoding process depicted in FIG. 11, where k1 is a positive integer less than both k and y. Encoder 48b simultaneously converts a k2-bit message into a z-bit codeword by following a second encoding process, which may also be a the rate ½, K=7, convolutional encoding process depicted in FIG. 11, where k2 is a positive integer less than both k and z. But the two encoders 48a and 48b implement different encoding processes because they process different input data causing them to traverse different states and causing the current and past states of one encoding process to exert no influence over the future states of the other. The n-bit codeword 50 results from combining the y-bit codeword with the z-bit codeword. For the example where two QPSK signals 76 and 78 (FIGS. 7A-7B) are encoded for a rate ½, 16-QAM in which 2-bit messages 44 are encoded into 4-bit codewords 50 per unit interval 42, k=2, k1=1, k2=1, n=4, y=2, and z=2.

During a unit interval t1, the 2-bit codeword from the first generator 48a selects the I1Q1 QPSK symbol 80 in phase map section 52. Also during unit interval t1, the second generator 48b selects the I2Q2 QPSK symbol 82 in phase map section 52. These two symbols 80 and 82 are vector added in phase map section 52 to produce the first 16-QAM symbol 90 (FIG. 8B) which is transmitted. In the preferred embodiment, phase map section 52 is implemented in a memory look-up table. Thus, transmit phase point data stored in the memory represent the phase rotation depicted above in FIG. 7B and the vector addition result depicted in FIG. 8B for all combinations of symbols 80 and 82. But this form of implementation is not a requirement of the present invention.

At decoder 72 in receiver 34, there are four possible paths through the code tree for the first symbol 90 as indicated by the I1Q1 states at unit interval t2. For the second symbol 90, there are 16 possible paths as indicated by the I1Q1 states at unit interval t3. The most probable path is the one with the smallest path metric which is computed by adding the two residuals along the path entering the state at time t3.

For example, if the first symbol 90 transmitted was I1Q1="11", I2Q2="00" and the second symbol 90 transmitted was I1Q1="10", I2Q2="11", the path indicated by the heavy line in FIG. 14 should have the smallest path metric. Note that the ending state for I1Q1 at any current symbol time is also the beginning state for I1Q1 at its next symbol time. Likewise, the ending state for I2Q2 at any current symbol time is also the beginning state for I2Q2 at its next symbol time. This reflects the use of independent encoders 48, each of which applies its own encoding process to encode different, pseudo-orthogonal portions of the n-bit codeword 50.

In a manner understood by those skilled in the art, the Viterbi decoding algorithm converts the encoder tree representation into a decoder trellis diagram and selects the path through the trellis as the one with the smallest metric. The encoder tree illustrated in FIG. 14 is somewhat similar to that used in TCM. However, other decoding algorithms such as sequential decoding can also be used. In fact, block codes could even be used to indicate the minimum metric path through the code tree.

However, irrespective of which decoding method is used, if the error-free path is taken, which is the path that results from branch metrics generated in accordance with the single correct hypothesis made in branch metrics generator 66 during each unit interval 42, then the two QPSK signals are effectively orthogonal. That is, along the correct path, the second QPSK signal 78 is completely cancelled and has no influence on the first QPSK signal 76. Therefore, the first QPSK signal 76 is decoded as though it were the only signal transmitted.

For example, it requires an $E_b/N_0$ of 4.5 dB to decode QPSK at a $2\times10^{-5}$ BER using standard rate ½ Viterbi decoding of constraint length 7. It requires less than another % dB to decode 16-QAM using this pseudo-orthogonal coding method. This $E_b/N_0$ increase is due to the increased power in the FIG. 8B 16-QAM constellation with respect to the power in either the I1Q1 or I2Q2 QPSK constellations individually.

Figure 15:
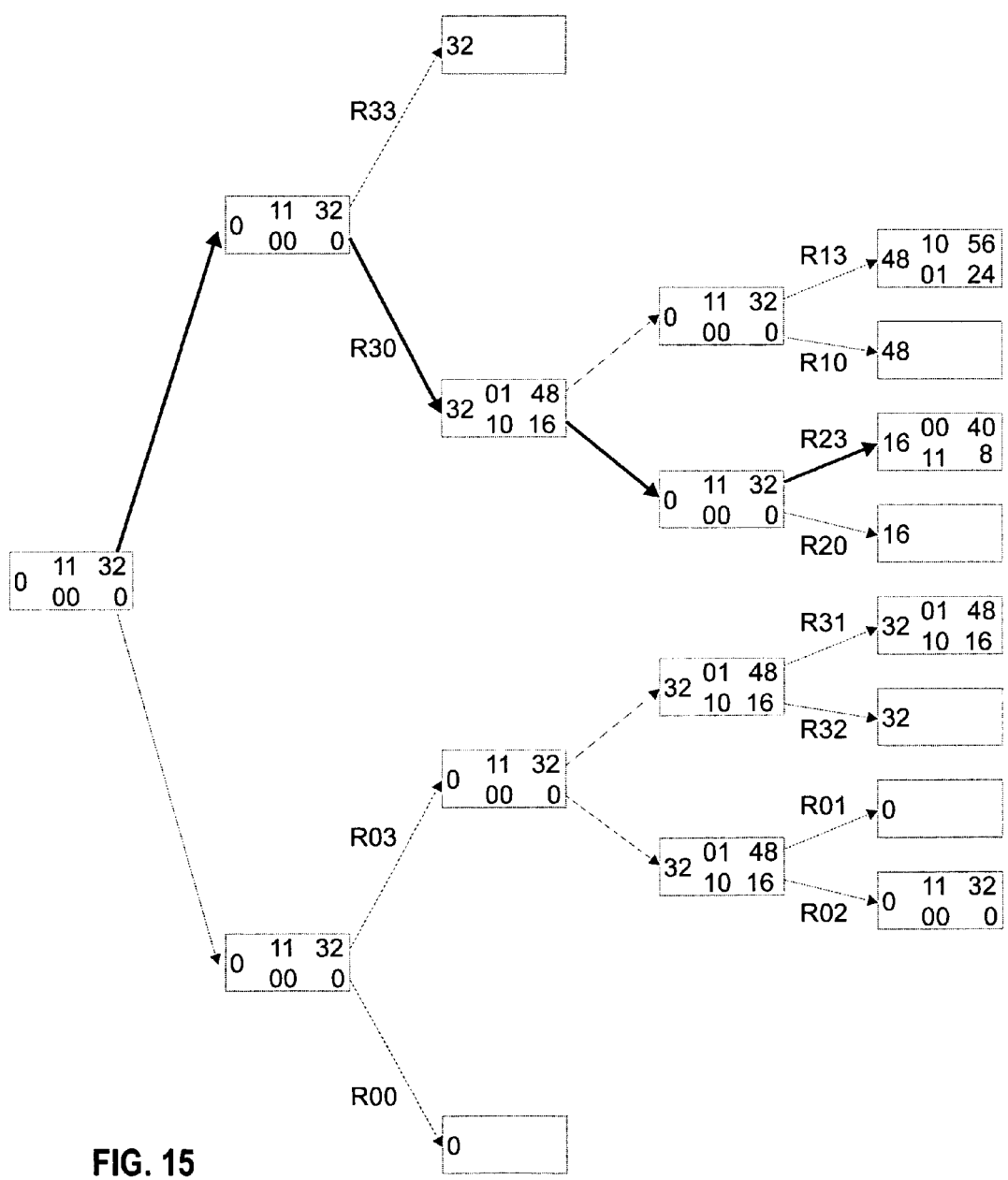
FIG. 15 shows a trellis diagram formed from the tree diagram of FIG. 14.

FIG. 15 shows a trellis diagram formed from the tree diagram of FIG. 14. FIG. 15 depicts an example of a Viterbi type of decoder 72. At the start of unit interval t2, the two lower paths converge to state 0 and the two upper paths converge to state 32. If we assume the correct path residual R30 is less than the incorrect path residual R33, then the Viterbi algorithm eliminates the R33 path and keeps the R30 path. Likewise, if we assume the incorrect path R03 residual is less than the incorrect path R00 residual, then the R03 path is retained and the R00 path eliminated.

At the start of unit interval t3, two paths are converging on each of the states 0, 32, 16, and 48. Again, the Viterbi algorithm retains the path with the lowest residual and eliminates the path with the largest residual. This process is repeated for every decoding state time.

After at least 5 times the code constraint length, the path with the smallest metric is traced back, and the I0Q0, I1Q1 message symbols for the oldest state are hard-decoded as k-bit message estimate 74.

Figure 16:
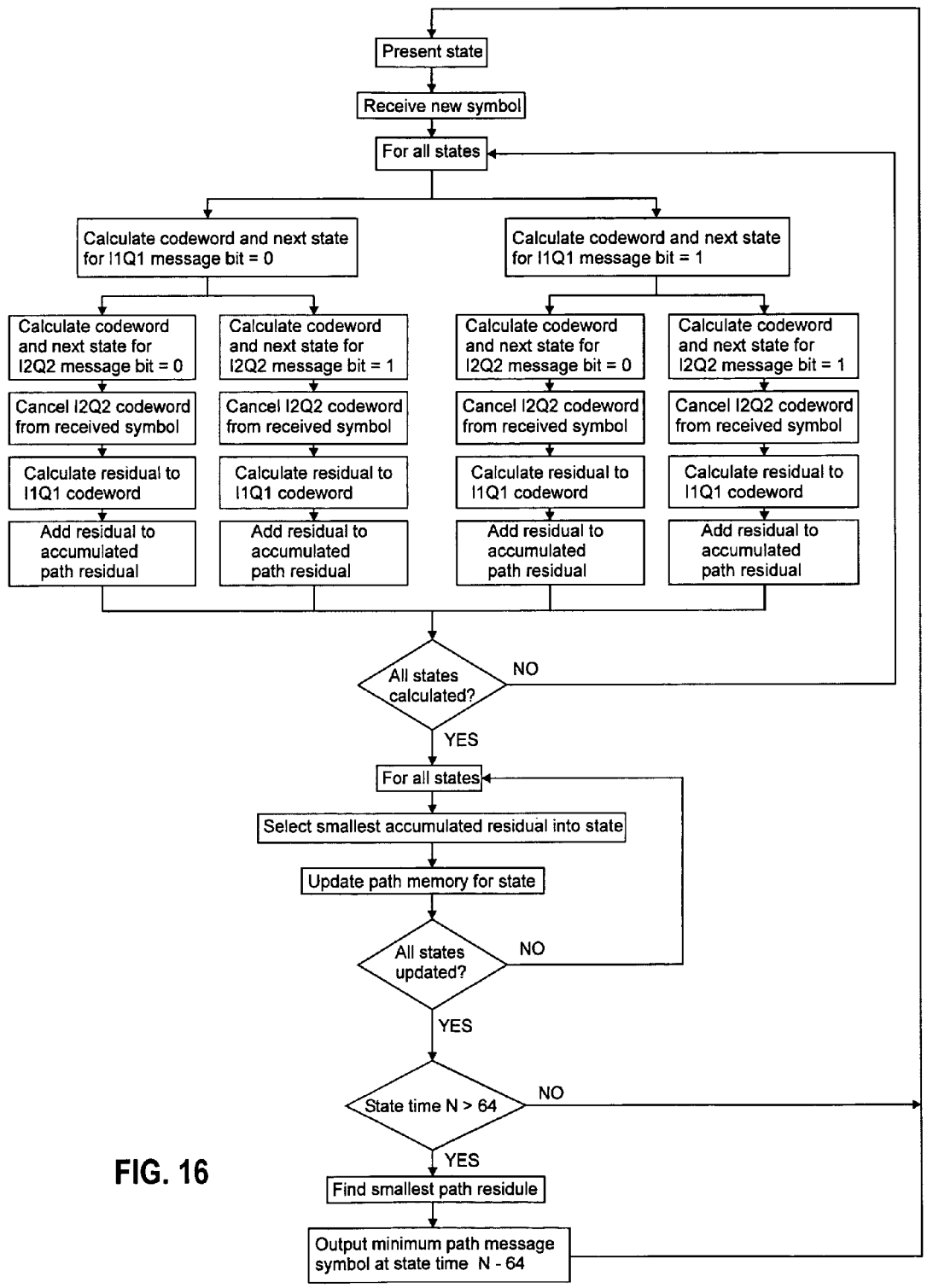
FIG. 16 shows a flow chart of a Viterbi decoding algorithm that may be implemented by a decoder in a receiver of the communication system of FIG. 5.

FIG. 16 shows a flow chart of a Viterbi decoding algorithm that may be implemented by branch metrics generator 66 and decoder 72 in receiver 34 of communication system 30. In the algorithm of FIG. 16, the message symbol is decoded after 64 state times (N=64). Following the algorithm of FIG. 16, after the trellis diagram is fully developed all states will be present. Residuals are calculated for all possible paths and all paths into each new state are eliminated except for the minimum path. Starting at state time 65, the oldest message symbol associated with the minimum residual path is decoded.

In the examples illustrated above, the I1Q1 symbols 80 were considered the desired symbols and the I2Q2 symbols 82 were considered the interfering symbols. At branch metrics generator 66 in receiver 34, however, the I2Q2 symbols 82 can be treated as the desired symbols and the I1Q1 symbols 80 as the interfering symbols.

Figure 17:
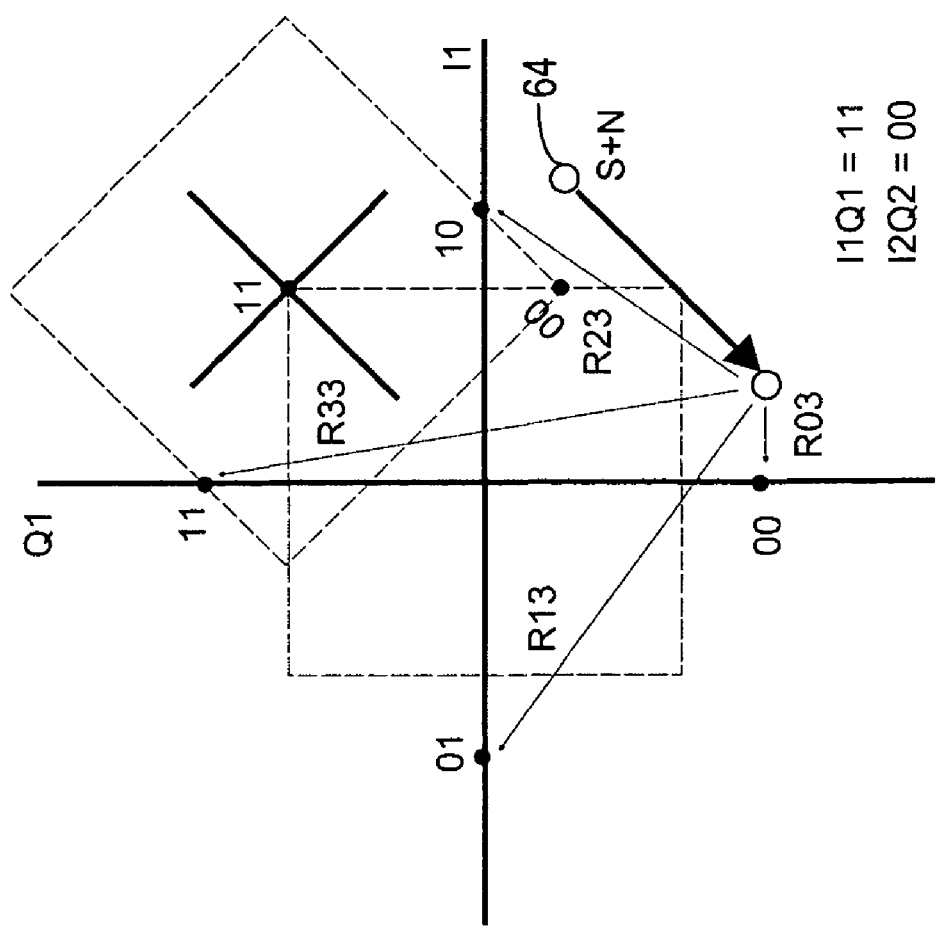
FIG. 17 graphically shows the cancellation of an I1Q1 symbol from a receive phase point to leave an I2Q2 symbol.

FIG. 17 graphically shows the cancellation of a I1Q1 symbol 80 from a receive phase point 64 to leave an I2Q2 symbol 82. In FIG. 17, the I2Q2 symbols 82 are projected onto the I1Q1 axis. For the case in FIG. 17 where the I1Q1="11" symbol 80, I2Q2="00" symbol 82 was transmitted, the I1Q1="11" symbol 80 is canceled which moves the noise corrupted offset phase point close to the noise free I2Q2="00" symbol. The residuals are indicated.

Entering the residuals obtained by canceling the I1Q1 symbols 80 into the Viterbi decoder will cause a different path to be taken through the decoder trellis. At low signal levels, the error rate and location of the errors can be different from those obtained by canceling I2Q2.

This allows a separate Viterbi decoder to be used for each set of residuals and their path metrics to be compared to select the path with the smallest metric. Alternatively, the I1Q1 symbols 80 could be determined using a first Viterbi decoder on the 16-QAM constellation as just described. These symbols could then be canceled to produce a I2Q2 QPSK constellation. The I2Q2 symbols 82 could then be decoded using a standard QPSK Viterbi decoder.

Additionally, different code generators 48 could be used to encode the two separate QPSK signals 76 and 78. Different code generators would tend to place errors at different locations which would increase the probability of correcting them by comparing metrics between the two Viterbi decoders. Finally, since the message stream 50 is encoded using separate codes, the two Viterbi decoders could be used in an iterative feedback fashion similar to turbo codes. That is, multiple passes could alternatively be made through each of the decoders and the metrics updated and improved after each pass.

However, configuring decoder 72 to implement a sequential decoding algorithm, as described below, appears to provide particularly beneficial results. Simulations, using this technique, indicate that an $E_b/N_0$ of only 2 dB is required to decode 16-QAM at a BER of $5\times10^{-5}$ that was encoded using a Viterbi rate ½ code of constraint length 7. This is within 0.25 dB of the Shannon capacity bound for a rate ½ signal. Using a longer constraint length would place the performance even closer to the bound.

The large error path residuals, associated with the pseudo-orthogonal coding technique discussed herein, allows an efficient sequential decoder algorithm to be implemented. In a sequential decoder, all paths through the trellis are retained until it is nearly certain that a particular path cannot be the correct path. Typically, the metric used to eliminate paths is the value of the residuals.

Since the number of possible paths through the trellis increase exponentially, erroneous paths are desirably identified and eliminated quickly or the decoder hardware size becomes unreasonable. But the large erroneous path residuals (i.e., branch metrics) resulting from the above-described techniques, allows a powerful sequential decoder to be implemented with reasonable hardware resources.

Specifically, all paths are retained in decoder 72 until the path residual exceeds the minimum path residual plus a threshold value. The threshold value is selected based on a tradeoff between the desired minimum $E_b/N_0$ operating point and the required decoder resources.

Figure 18:
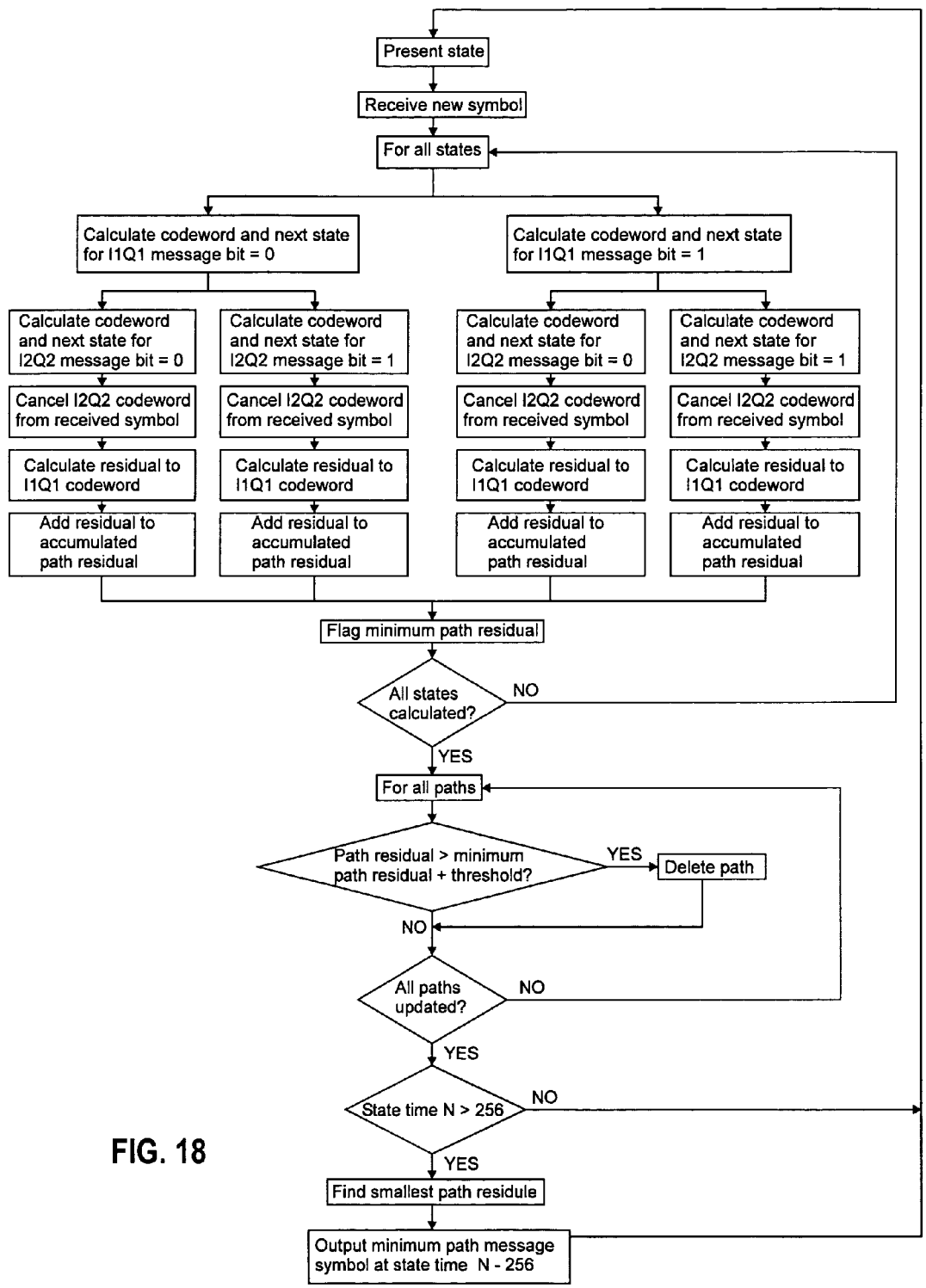
FIG. 18 shows a flow chart of a sequential decoding algorithm that may be implemented by a decoder in a receiver of the communication system of FIG. 5.

A flowchart of this sequential decoding technique is illustrated in FIG. 18. The sequential decoding algorithm of FIG. 18 is similar to Viterbi decoding except that all paths in the Viterbi algorithm of FIG. 16 are retained until they become too large.

Coding performance also increases as the trace back distance becomes larger because the longer paths provide more opportunity to throw out wrong paths. That is, noise may occasionally make the correct path residual larger than a particular wrong path over short time periods. However, statistically the residuals of wrong paths increase faster than the residual of the correct path, as the path length increases, because making the wrong assumption pushes the input symbol away from the correct symbol. This artificially increases wrong path residuals more than noise increases the correct path residual.

Figure 19A:
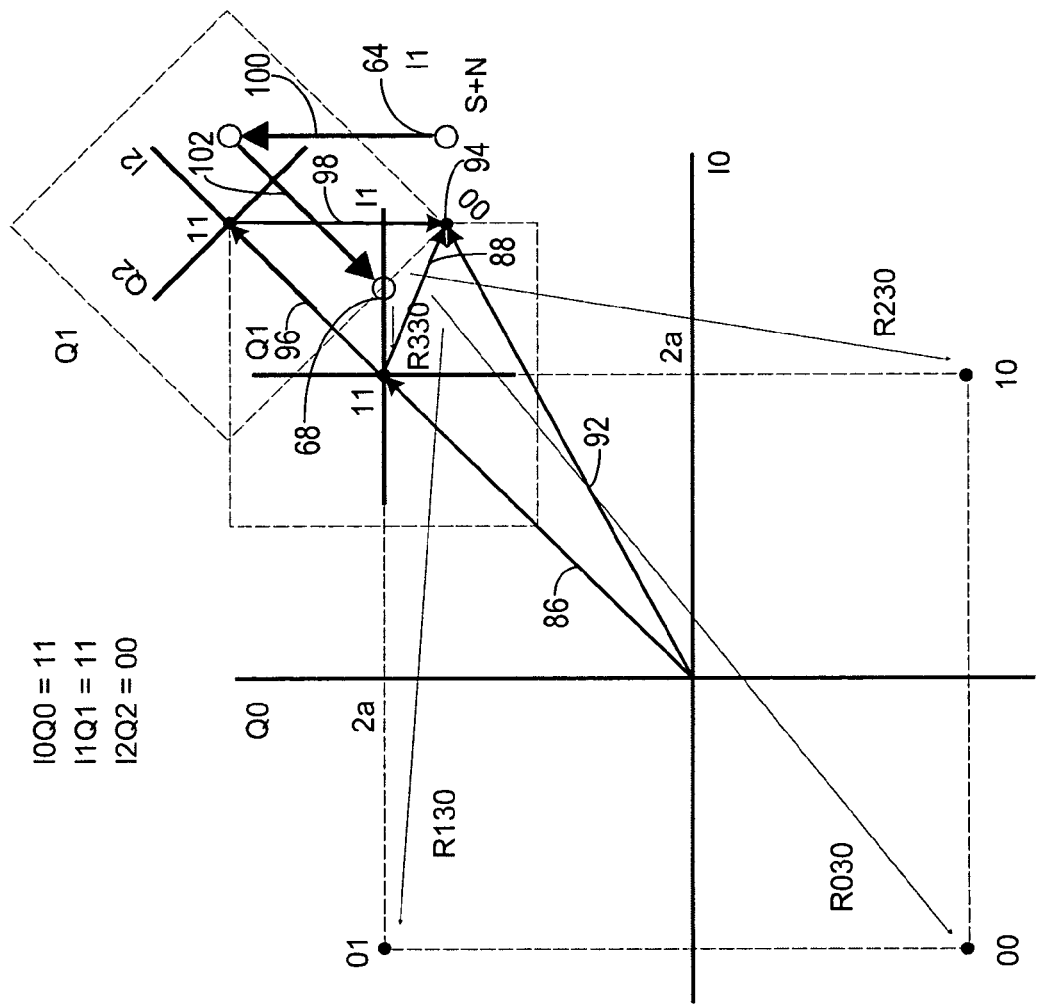
FIGS. 19A-19C show a first 64-QAM embodiment of a phase point constellation built from three pseudo-orthogonal QPSK signals in a manner consistent with the teaching of the present invention.
Figure 19C:
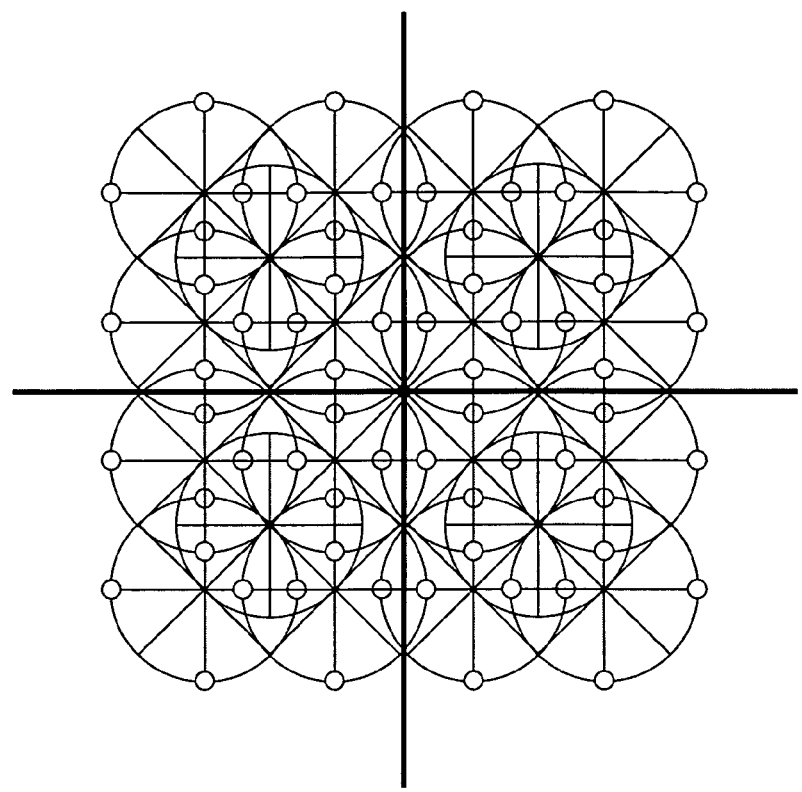
Figure 19B:
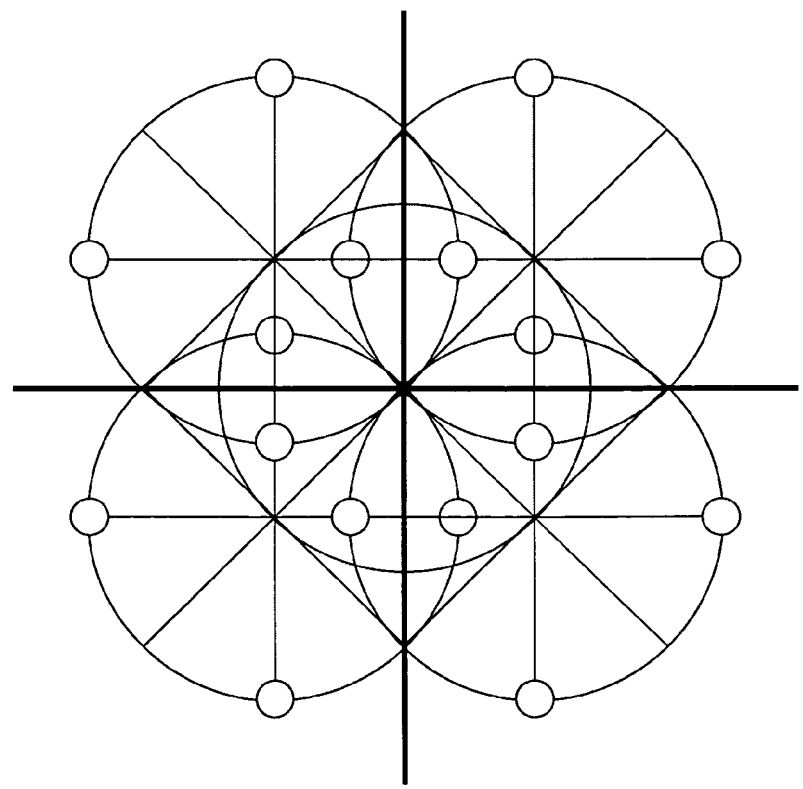

FIGS. 19A-19C show a first 64-QAM embodiment of a phase point constellation 84 consistent with the teaching of the present invention. In the embodiment of FIGS. 19A-19C, the above-discussed modulation and coding techniques are extended to include additional QPSK signals. Referring briefly to FIG. 5, a FEC encoder 48c is included in addition to encoders 48a and 48b to encode a 1-bit per unit interval 42 message stream parsed out from k-bit message stream 44. Encoder 48c would be omitted for the 16-QAM example discussed above. Where n-bit codeword 50 was provided above in the 16-QAM example by the combination of a y-bit codeword from FEC encoder 48a and a z-bit codeword from FEC encoder 48b, n-bit codeword 50 is now provided by the combination of a y-bit codeword from encoder 48a and a z-bit codeword from encoders 48b and 48c. In each unit interval 42, encoder 48b provides a z1-bit codeword, encoder 48c provides a z2-bit codeword, and z=z1+z2, where z, z1, and z2 are positive integers.

In FIG. 19A, the 16-QAM constellation formed from I1Q1 and I2Q2 in the previous example is added to a new I0Q0 QPSK constellation whose amplitude is twice that of the I1Q1 and I2Q2 constellations. If the I0Q0="11", I1Q1="11", I2Q2="00" symbol 94 serves as transmit phase point 54 and is transmitted, it equals the vector sum of a phase-space vector 86 corresponding to the I0Q0="11" symbol 80, a phase-space vector 96 corresponding to I1Q1="11", and a phase-space vector 98 corresponding to I2Q2="00". The vector sum of phase-space vectors 86, 96, and 98 is phase-space vector 92. The vector sum of phase-space vectors 96 and 98 equals phase-space vector 88. FIG. 19A depicts only one each of phase-space vectors 86, 88, 96, 98, and 92. But in the 64-QAM constellation of FIG. 19A, in any given unit interval 42: a) phase-space vector 86 is selected from a set of $2^y$ different phase-space vectors by y bits from n-bit codeword 50, b) phase-space vector 96 is selected from a set of $2^{z1}$ different phase-space vectors by z1 bits from n-bit codeword 50, c) phase-space vector 98 is selected from a set of $2^{z2}$ different phase-space vectors by z2 bits from n-bit codeword 50, and d) phase-space vector 88 comes from a set of $2^z$ different phase-space vectors as defined by z bits from n-bit codeword 50.

If the I0Q0="11", I1Q1="11", I2Q2="00" symbol 94 is transmitted in a given unit interval 42 as transmit phase point 54, and the receive phase point 64 is slightly to the right of the noise-free symbol location, the I2Q2 and I1Q1 symbols are respectively cancelled as shown by cancellation vectors 100 and 102, respectively. The first upward movement cancels the I2Q2 symbol. The downward left movement cancels the I1Q1 symbol. This places the resulting offset phase point 68 at the same location receive phase point 64 would have been had only the I0Q0 QPSK signal been transmitted. Also shown are the error residual designations and their distances.

To better visualize the 64-QAM constellation, the previous example 16-QAM constellation is redrawn in FIG. 19B using open circles for the symbol points. The origin of one of these 16-QAM constellations is then placed at each symbol location of the I0Q0 QPSK constellation. The result is the constellation illustrated in FIG. 19C.

Figure 20:
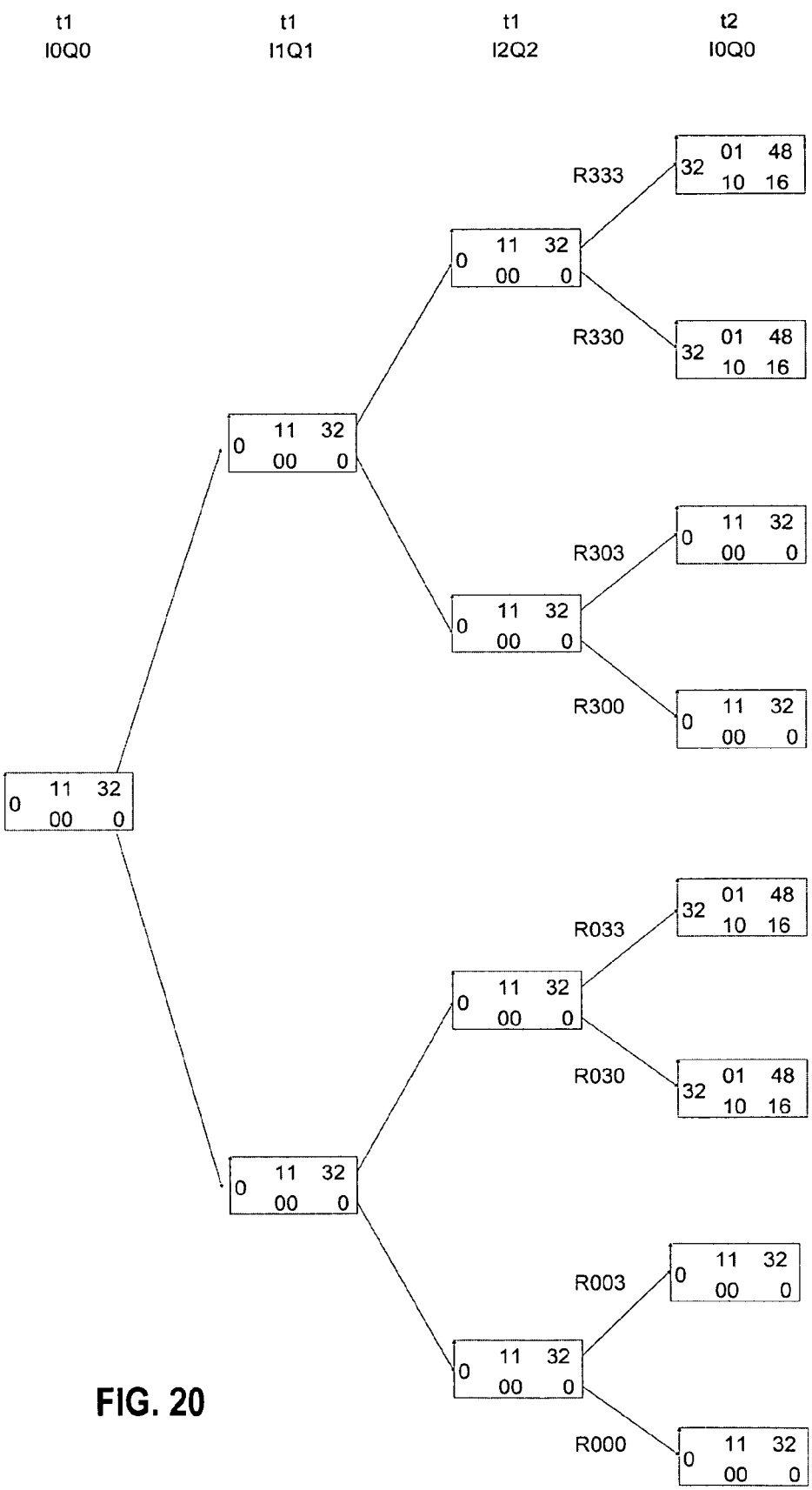
FIG. 20 shows a tree diagram that indicates how the three QPSK signals from the example of FIGS. 19A-19C may be encoded.

FIG. 20 illustrates how the three QPSK signals from the example of FIGS. 19A-19C may be encoded. A first Viterbi generator 48a is used to encode the I0Q0 symbols, a second encoder 48b for the I1Q1 symbols, and a third encoder 48c for the I2Q2 symbols. During unit interval t1, the 2-bit codeword from the encoder 48a selects the I0Q0 QPSK symbol in phase map section 52. Also during unit interval t1, the second encoder 48b selects the I1Q1 QPSK symbol in phase map section 52, and the third encoder 48c selects the I2Q2 symbol in phase map section 52. These three symbols are phase-rotated and added within phase map section 52 to produce the first 64-QAM symbol 94 which is transmitted from transmitter 32.

At receiver 34, there are eight possible paths through the code tree for the first symbol 94 as indicated by the I0Q0 states at unit interval t2. The most probable path is the one with the smallest path metric which is equal to the single path residual for the first received symbol. For subsequent received symbols, the code tree is extended in the same fashion as was illustrated in FIGS. 14-15.

In one embodiment of the present invention, decoder 72 implements a sequential decoding algorithm. The above-discussed pseudo-orthogonal coding techniques, when combined with the sequential decoding algorithm, allows very efficient high-order constellations to be formed. In fact, such high-order constellations could not be formed using current decoding techniques.

Figure 21B:
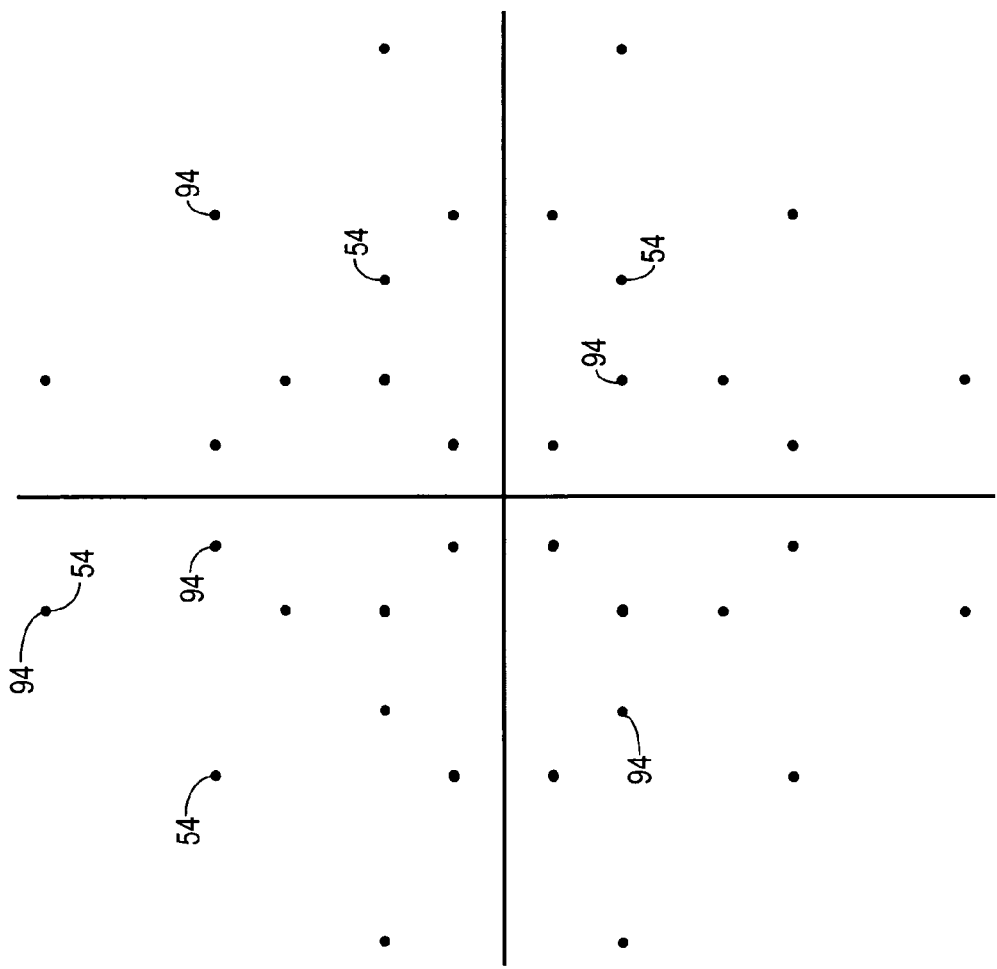
FIGS. 21A and 21B show a second 64-QAM embodiment of a phase point constellation built from three pseudo-orthogonal QPSK signals in a manner consistent with the teaching of the present invention.
Figure 21A:
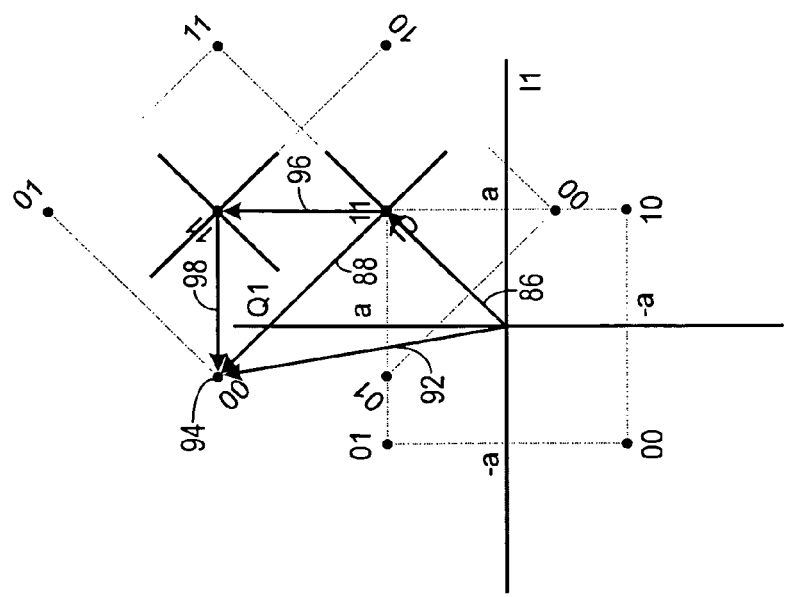

FIGS. 21A and 21B show a second 64-QAM embodiment of a phase point constellation built from three pseudo-orthogonal QPSK signals in a manner consistent with the teaching of the present invention. Referring to FIGS. 8A-8B and 21A-21B, a 64-QAM constellation can be formed by rotating an additional, $3^{rd}$ QPSK constellation −45 degrees and placing it's origin at each of the 16-QAM points 84 shown in the FIG. 8B constellation. FIG. 21A depicts the constituent pseudo-orthogonal QPSK signals. FIG. 21B shows the resulting 64-QAM constellation.

Referring to FIG. 21B, more than one I1Q1, I2Q2, I3Q3 symbol 94 maps into identical transmit phase points 54. Therefore, only 36 constellation points are required to define 64 different symbols. Such a constellation is permitted because the FEC encoders 48 never allow the same constellation point to be reached at the same time. That is, the identical constellation points can only be reached at different times via very different series of QPSK input symbols.

As discussed above, in decoder 72, which is preferably a sequential decoder, the symbols 94 are decoded, not exclusively by the current receive phase point 64, but more by the path through the trellis by which they arrive at the current receive point 64. Since incorrect hypotheses about which I2Q2 and I3Q3 symbols were transmitted lead to very large residuals in the operation of branch metrics generator 66, erroneous paths that lead to one of the identical constellation points tend to be very large with respect the correct path.

In summary, a preferred embodiment of the present invention combines lower order constellations into higher order constellations in a manner that allows the lower order constellations to appear pseudo-orthogonal in the decoding process. By selecting the correct path through the decoder code tree, the additional low order constellation signals have no effect on the primary low order constellation signal. That is, the low order constellation signals appear to be pseudo-orthogonal to each other.

The preferred embodiments of the present invention have been illustrated and described in detail. However, it will be readily apparent to those skilled in the art that various modifications may be made therein without departing from the spirit of the invention.

For example, as the $E_b/N_0$ decreases, more and more paths are retained within decoder 72 because noise increases the correct path residuals, and thus requires a higher threshold to prevent elimination of the correct path. Adding a short parity check code is an efficient method of reducing decoder resources. That is, the inner code allows the decoder to determine which of the retained paths, based on residual value, can be possible paths. Any retained path that fails the parity check cannot be the correct path and can be eliminated.

Such a parity check code is not used for error correction per say, but rather it is used to enhance the determination of retaining the correct path. If the correct path can be retained, then the BER for the high order constellation is equal to the BER of the elementary QPSK constellation from which the high order constellation was formed. That is, cancellation removes the effects of the summed additional QPSK constellations and leaves the base QPSK constellation.

Although the preferred embodiments discussed herein are concerned with rate ½ encoding, where two bits of codeword are generated for each bit of data message, this is not a requirement. Nothing requires that every pseudo-orthogonal signal receive FEC encoding. Thus, for example a rate ¾ version of a 16-QAM embodiment could be provided by omitting one of encoders 48 altogether and passing an additional bit of message data onto codeword 50 per unit interval 42.

Although the preferred embodiment favors combining QPSK signals into QAM constellations and using convolutional coding, this method is not limited to either. Other constellations and types of coding can be devised. Also, it is well known that convolutional codes, such as taught herein, can be punctured to increase the code rate, and inner block codes can be concatenated with a convolutional outer code to increase coding performance. These and other modifications known to those skilled in the art are to be included within the scope of the present invention.

What is claimed is:

1. A method for communicating an n-bit codeword in a unit interval, where n=y+z and where n, y, and z are positive integers, said method comprising:
    transmitting a transmit phase point selected from a constellation of phase points;
    generating a receive phase point responsive to said transmit phase point and to noise;
    forming $2^z$ alternate hypotheses about potential combinations of said z bits of said n-bit codeword, wherein one of said $2^z$ hypotheses is correct and $2^z-1$ of said $2^z$ hypotheses are incorrect; and
    applying a forward error correction (FEC) decoding process to said $2^z$ alternate hypotheses to accept and reject said hypotheses in addition to counteracting said noise; and
    wherein a first phase-space vector is selected from a set of $2^y$ different phase-space vectors by said v bits of said n-bit codeword;
    a second phase-space vector is selected from a set of $2^z$ different phase-space vectors by said z bits of said n-bit codeword; and
    said transmit phase point is responsive to a vector sum of said first and second phase-space vectors.

2. A method as claimed in claim 1 wherein said first phase-space vector exhibits substantially the same magnitude as said second phase-space vector.

3. A method as claimed in claim 1 wherein:
    said positive integer y equals two; and
    each of said $2^y$ different phase-space vectors exhibits substantially equal magnitude to all of the others of said $2^y$ different phase-space vectors and is rotated 90° from two of the others of said $2^y$ different phase-space vectors.

4. A method as claimed in claim 1 wherein:
    said positive integer z equals two; and each of said $2^z$ different phase-space vectors exhibits substantially equal magnitude to all of the others of said $2^z$ different phase-space vectors and is rotated 90° from two of the others of said $2^z$ different phase-space vectors.

5. A method as claimed in claim 4 wherein said $2^y$ different phase-space vectors are rotated with respect to said $2^z$ different phase-space vectors.

6. A method as claimed in claim 1 wherein: said integer z equals z1+z2, where z1 and z2 are positive integers;
    said second phase-space vector is responsive to a vector sum of a third phase-space vector and a fourth phase-space vector;
    said third phase-space vector is selected from a set of $2^{z1}$ different phase-space vectors by z1 bits from said n-bit codeword; and
    said fourth phase-space vector is selected from a set of $2^{z2}$ different phase-space vectors by z2 bits from said n-bit codeword.

7. A method as claimed in claim 1 additionally comprising:
    parsing a k-bit message into a k1-bit message and a k2-bit message, where k, k1, and k2 are positive integers;
    converting said k1-bit message into a y-bit codeword by a first forward-error-correction (FEC) encoding process, where y is a positive integer greater than k1 and less than n;
    converting said k2-bit message into an z-bit codeword by a second FEC encoding process, where z is a positive integer greater than k2 and less than n; and
    combining said y-bit codeword with said z-bit codeword to form said n-bit codeword.

8. A method as claimed in claim 1 additionally comprising for each of said $2^z$ alternate hypotheses, offsetting said receive phase point by a vector responsive to said hypothesis to define an offset phase point.

9. A method as claimed in claim 1 wherein:
    $2^z$ offset phase points are defined for said receive phase point;
    each of said $2^z$ offset phase points is offset from said receive phase point by a vector responsive to one of said $2^z$ alternate hypotheses; and
    said method additionally comprises the activity of generating branch metrics in response to offset phase points.

10. A method as claimed in claim 9 wherein:
    said receive phase point equals the vector sum of a first signal which is responsive to y bits of said n-bit codeword, a second signal which is responsive to z bits of said n-bit code word, and noise; and said branch-metrics-generating activity generates said branch metrics in response to Euclidean distances between $2^y$ potential values of said first signal and said $2^z$ offset phase points.

11. A method as claimed in claim 1 wherein:
said method additionally comprises generating $2^{y+z}$ branch metrics in response to said receive phase point;
$2^z$ offset phase points are defined for said receive phase point;
$2^y$ of said branch metrics are generated for each of said $2^z$ offset phase points; and
said $2^z$ offset phase points are offset from said receive phase point by vectors that are responsive to said $2^z$ alternate hypotheses.

12. A method as claimed in claim 11 wherein:
said receive phase point equals the sum of a first signal which is responsive to y bits of said n-bit codeword, a second signal which is responsive to z bits of said n-bit code word, and noise; and
said branch-metrics-generating activity generates said branch metrics in response to Euclidean distances between $2^y$ potential values of said first signal and said $2^z$ offset phase points.

13. A method as claimed in claim 1 additionally comprising performing a forward error correction (FEC) encoding process to convert a k-bit message, where k is a positive integer less than n−1, into said n-bit codeword.

14. A method as claimed in claim 13 wherein said constellation of phase points includes fewer than $2^n$ phase points.

15. A method for communicating an n-bit codeword in a unit interval, where n=y+z and where n, y, and z are positive integers, said method comprising:
transmitting a transmit phase point selected from a constellation of phase points, wherein: a first phase-space vector is selected from a set of $2^y$ different phase-space vectors by said y bits of said n-bit codeword;
a second phase-space vector is selected from a set of $2^z$ different phase-space vectors by said z bits of said n-bit codeword; and
said transmit phase point is responsive to a vector sum of said first and second phase-space vectors;
generating a receive phase point responsive to said transmit phase point and to noise;
defining a plurality of offset phase points each of which is responsive to said receive phase point; and
decoding said offset phase points; and
wherein said defining activity comprises forming $2^z$ alternate hypotheses about potential combinations of said z bits of said n-bit codeword, wherein one of said $2^z$ hypotheses is correct and $2^z-1$ of said $2^z$ hypotheses are incorrect; and
said decoding activity applies a forward error correction (FEC) decoding process to said $2^z$ alternate hypotheses to accept and reject said hypotheses in addition to counteracting said noise.

16. A method as claimed in claim 15 additionally comprising generating branch metrics responsive to said offset phase points so that said decoding activity is responsive to said branch metrics.

17. A receiver for use in a communication system in which a codeword transformed into a transmit phase point is transmitted during a unit interval, said receiver comprising:
a receive phase point generator configured to generate a receive phase point responsive to said transmit phase point and to noise;
a branch metrics generator configured to define a plurality of offset phase points wherein each of said offset phase points is responsive to said receive phase point, and to generate branch metrics which are responsive to said offset phase points; and
a decoder coupled to said branch metrics generator; and
wherein said codeword is conveyed by n bits, where n bits=y bits+z bits and n, y, and z are positive integers;
said branch metrics generator is configured so that said offset phase points represent $2^z$ alternate hypotheses about potential combinations of said z bits of said n-bit codeword, wherein one of said $2^z$ hypotheses is correct and $2^z-1$ of said $2^z$ hypotheses are incorrect; and
said decoder is configured to apply a forward error correction (FEC) decoding process to said $2^z$ alternate hypotheses to accept and reject said hypotheses in addition to counteracting said noise.

18. A receiver as claimed in claim 17 wherein:
each of said plurality of offset phase points is offset from said receive phase point by a vector responsive to one of said $2^z$ alternate hypotheses;
said receive phase point equals the vector sum of a first signal which is responsive to said y bits of said n-bit codeword, a second signal which is responsive to said z bits of said n-bit code word, and noise; and
said branch metrics generator generates said branch metrics in response to Euclidean distances between $2^y$ potential values of said first signal and said $2^z$ offset phase points.

19. A receiver as claimed in claim 17 wherein said decoder is a sequential decoder.

* * * * *